US009459980B1

(12) United States Patent
Arguelles

(10) Patent No.: US 9,459,980 B1
(45) Date of Patent: Oct. 4, 2016

(54) VARYING CLUSTER SIZES IN A PREDICTIVE TEST LOAD WHILE TESTING A PRODUCTIVE SYSTEM

(71) Applicant: Amazon Technologies, Inc., Reno, NV (US)

(72) Inventor: Carlos Alejandro Arguelles, Shoreline, WA (US)

(73) Assignee: Amazon Technologies, Inc., Reno, NV (US)

( * ) Notice: Subject to any disclaimer, the term of this patent is extended or adjusted under 35 U.S.C. 154(b) by 766 days.

(21) Appl. No.: 13/864,905

(22) Filed: Apr. 17, 2013

(51) Int. Cl.
G06F 17/00 (2006.01)
G06F 11/30 (2006.01)
G06Q 10/06 (2012.01)

(52) U.S. Cl.
CPC ............... *G06F 11/30* (2013.01); *G06Q 10/06* (2013.01)

(58) Field of Classification Search
CPC ...................................................... G06Q 10/06
USPC ...................................... 706/12, 45; 714/32
See application file for complete search history.

(56) References Cited

U.S. PATENT DOCUMENTS

| | | | |
|---|---|---|---|
| 8,086,720 B2 | 12/2011 | Breese et al. | |
| 8,185,619 B1 | 5/2012 | Maiocco et al. | |
| 2007/0016389 A1* | 1/2007 | Ozgen | E21B 49/00 703/10 |
| 2007/0168494 A1* | 7/2007 | Liu et al. | G06Q 10/06 709/224 |
| 2009/0106012 A1* | 4/2009 | Liu | H04L 63/20 703/21 |
| 2013/0132553 A1* | 5/2013 | Stratton | H04L 41/50 709/223 |
| 2013/0179144 A1* | 7/2013 | Lu et al. | G06F 11/3414 703/20 |

OTHER PUBLICATIONS

U.S. Appl. No. 13/466,943, filed Mar. 8, 2012, Ramakrishnan H. Chandrasekharapuram.
U.S. Appl. No. 13/466,951, filed Mar. 8, 2012, Ramakrishnan H. Chandrasekharapuram.
U.S. Appl. No. 13/466,955, filed Mar. 8, 2012, Ramakrishnan H. Chandrasekharapuram.

* cited by examiner

*Primary Examiner* — David Vincent
(74) *Attorney, Agent, or Firm* — Robert C. Kowert; Meyertons, Hood, Kivlin, Kowert & Goetzel, P.C.

(57) ABSTRACT

Automated methods of creating a predictive test load, using clustering to create the predictive test load from production data, for testing in a production environment. Client requests to a production system are captured and processed into production request data. The production request data undergoes a clustering analysis to determine cluster definitions. In some embodiments, the production request data is turned into vectors and the vectors undergo the clustering analysis instead of the production data. A specification may be received that specifies modifications to be made to the production data. The production request data may be processed using the cluster definitions and the specified modifications to create a predictive test load. In some embodiments, the predictive test load is played to a production system to simulate a predictive load according to a test plan. The test plan may specify the rate at which the test load is replayed.

20 Claims, 22 Drawing Sheets

VARYING CLUSTER SIZES IN A PREDICTIVE TEST LOAD WHILE TESTING A PRODUCTIVE SYSTEM

BACKGROUND

Large scale computing systems such as those found in network-based production services have become widely available in recent years. Examples of these systems are on-line retail, on-line internet service providers, on-line businesses such as photo processing, corporate networks, cloud computing services and/or web-based hosting services. These businesses may have multiple computing devices (e.g., thousands of hosts) in geographically separate locations configured to process millions of client requests daily or even hourly, for example. Ensuring that these services can scale to handle abnormal loads (e.g., client requests) is a non-trivial problem. Instead of testing an actual production system, software testers usually create a scaled-down copy of a production system with a smaller number of hosts and test with a smaller, proportional load. Other approaches include component-level stress tests where a single component of the architecture is targeted with each tests. In some instances, software testers will test with engineered data that has no relationship to actual production data. Creating engineered data out of thin air requires the tester to have some knowledge of the production data patterns in order to build a model. Furthermore, the model is not guaranteed to simulate production traffic in a realistic manner. For example, randomly generated data may not accurately reflect relationships between transactions (e.g., user X takes steps a, b, and c in the website with specific latency; these would be separate transactions but there is a specific relationship between them not reflected in generated data).

Additionally, using real-world data on a large scale stress test is also challenging. For example, using production data may prevent testing potential or expected situations. What if right now 30% of the transactions are of type X, but this is expected to go up to 80% in the future? Using existing production data would not test this scenario. Furthermore, existing test solutions are not scalable to handle storing, accessing, processing and/or applying a load to test at the size of today's large production systems. As a further complication, it may be desirable to test for some time periods having loads that are many times the load of other time periods. For example, a business may want to test how a network site will handle increased traffic during a time period for which the business is advertising a special promotion, or test how a retail website will handle a volume of traffic expected on peak shopping days (e.g., Black Friday or Cyber Monday). Testing with the current level of production data would not test the increased traffic scenario.

Testing a large scale network with the methods described above often misses problems that would only surface on a higher scale or that is only available in the production system. Even when production data is used, it is difficult to model potential situations, especially those that expect a change of the mixture, or ratio of the transactions from the current production data. Additionally, the methods described above for testing components individually, for example, may not encounter issues that are found only through the interaction between subcomponents in a system. This may lead to outages in the production system that affect business revenue and degrade the customer experience.

Figure 1:
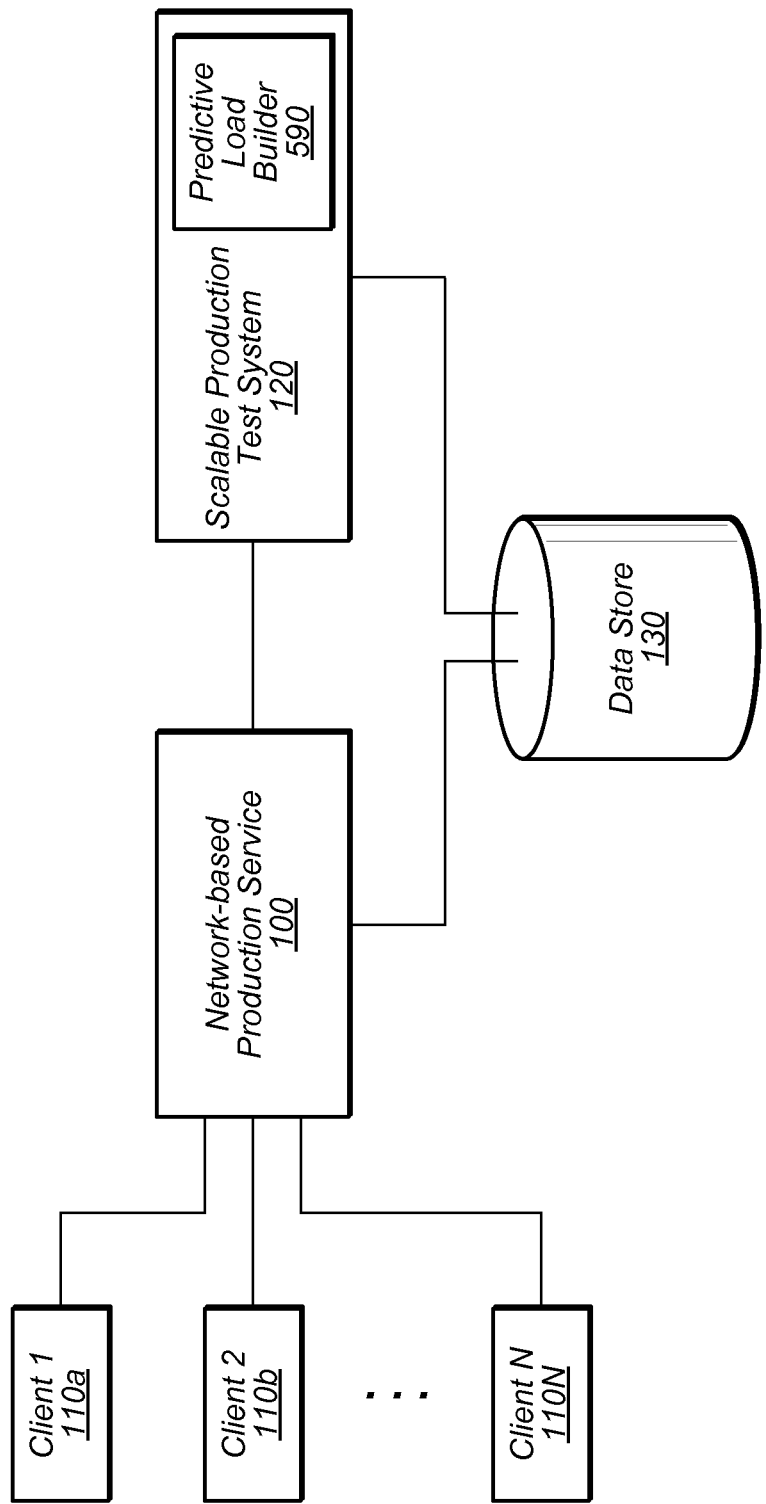
FIG. 1 illustrates a configuration of a system for testing a network-based production service that supports automated predictive load building and scalable testing, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As described herein, systems and methods for scalable testing of a production system with a predictive test load based on real production data are provided. A network-based production service implemented by one or more computers is configured to process request data from clients for the production service. Note, that as used herein, predictive test load and predictive data load may be used interchangeably. Production request data defining the requests are captured and stored in a data store for subsequent use in testing the production service. The production request data may be vectorized and cluster definitions may be determined from the vectors. Using the cluster definitions, the production request data is processed into a predictive data load according to a specification that specifies modifications for the production request data. In some embodiments, a specification for a predictive test may specify modifications to the relative sizes of clusters of captured production request data for one or more intervals. The predictive data load may be generated by adding data from one or more clusters of another interval of stored production request data. Production request data may also be deleted from one or more clusters in the interval to form the predictive request load. In some embodiments, a test system is implemented by one or more computers and comprises one or more controllers configured to create test jobs according to a test plan for testing the production service. The test plan may specify processed production request data (e.g., a predictive data load) and a profile for using the processed production request data to simulate a load on the production service. In some embodiments, a job queue is configured to receive and queue jobs from one or more controllers. The one or more controllers add test jobs to the job queue according to the test plan, in some embodiments. One or more workers are configured to access jobs from the job queue and access the processed stored production request data from the data store as specified in each job. The plurality of workers replay the production request data to the production service in some embodiments.

In some embodiments, a system for scalable testing of a production system with a predictive data load may include a predictive load builder with a predictive load processor, and a clustering component with a vectorization module and clustering module. The vectorization module is configured to vectorize intervals of the production request data into vectors. For example, the production request data for one or more intervals of time (e.g., a segment) may be processed into vectors having a particular set of fields. The clustering module is configured to determine cluster definitions that define clusters of the vectors. The predictive load processor is configured to process the production request data into a predictive data load according to the cluster definitions and specified modifications.

A network-based production service may be an on-line retail business that may process millions of client requests per day or even per hour, for example. However, on a given day such as peak shopping days (e.g., Black Friday, Cyber Monday) the number of client requests may be two to four times larger than an average day. In order to ensure the health of the production system during peak times, a test system may be implemented to test the production service hosting the on-line retail business. To create the test data, the client requests for a given time period may be captured for replay on the production system during test, for example. Client request data may be captured without interfering with the normal processing of the client requests. Examples of client request data are one or more web page requests, selecting an object in the web page, one or more of the steps of the check-out process for the on-line retail business, transactions, posts, or requests to a web services based computer or storage service. As used herein, production request data and transactions may be used interchangeably. The production request data (e.g., processed production client request data) may be processed into vectors and the vectors may be analyzed to determine cluster definitions. A specification may be created to indicate modifications to be made during processing of the production data into a predictive data load. The cluster definitions may be used to rearrange captured production request data according to the modifications in order to generate a predictive data load.

A test plan may be created to simulate a stressful load such as peak shopping days or an increasing/decreasing load (e.g., client data captured for replay during test). The production request data of the predictive load may be combined to create the test profile as determined by the test plan. The components utilized to test the production system may be auto-scaled to meet the demand of the test plan, for example. Controllers may create test jobs as determined by the test plan and submit the jobs to job queues as would client requests in a production service. Workers access the jobs from the job queue, access the predictive data load from a data store as specified in the jobs, and replay the predictive data load on the production service, for example. The simulated requests from the test jobs execute on the production service in parallel with ongoing client requests, for example. Workers and controllers may be scaled independently to implement the test plan and/or in response to one or more metrics. In addition, to ensure the health of the system and avoid affecting customers, an auto-shutdown module may be implemented to shut down the test in response to one or more system metrics.

FIG. 1 illustrates a configuration of a system for testing a network-based production service that supports automated analysis and modification of production data into a predictive data load, according to one embodiment. In general, a network-based production service 100 may be any type of network-based service, such as on-line retail, web service-based or cloud computing/storage, and/or image/web hosting service, for example. Network-based production service 100 receives requests from clients 110. Examples of requests received from clients 110 are request for one or more web pages viewable from a web-based browser, uploading one or more images to an online image processing business, requests to purchase an item, or accessing a remotely implemented computing environment. Network-based production service 100 may receive thousands or even millions of client requests per day, minute or seconds, for example. The client request data received by network-based production service 100 during a given time period is stored in production request data store 130 for later use during testing of network-based production service 100, in some embodiments. Examples of client request data are web page accesses, selecting a link on a webpage or uploading and/or downloading images/data. A predictive load builder 590 of a scalable production test system 120 processes production requests data into a predictive data load. Scalable production test system 120 may determine a test plan and create a test profile for use with the predictive data load. The predictive data load in production request data store 130 is accessed by scalable production test system 120 during testing of network-based production service 100. Various components replay the predictive data load of production request data to the network-based production service 100 to create "real-world", real-time, at scale simulations that stress network-based production service 100 safely.

In some embodiments, network-based production service 100 is a network-based service implemented by one or more computers configured to process client request data. An example of network-based production service 100 may be a remote computing service configured to allow multiple clients to configure dedicated computer environments. Other examples are businesses such as on-line retail, web-hosting services, on-line image processing, brokerage firms, remote data storage, email services and/or social media web-sites. In some embodiments, network-based production service 100 receives a plurality of requests from client 110. For example, requests from clients 110 may be requests to access product pages on an on-line retail site. As another example, requests from clients 110 may be requesting and/or submitting information to a social media site. For a given on-line retail site, the number of requests could be thousands or millions of requests per hour.

Production client requests are received by network-based production service 100 and processed in network-based production service 100. In addition, as a low level background task for example, the client request data may be captured on an ongoing basis without interfering with the normal processing of the client requests. The captured client request data is stored in data store 130 for subsequent use by scalable production test system 120. The production request data may be stored in time intervals such as minutes, for example. A time stamp and other identifying information are stored with the captured client request data, in some embodiments. In addition, the captured client request data is encrypted prior to storage in data store 130, in some embodiments. In some embodiments, captured client request data is referred to as production request data after capture, addition of metadata and encryption.

In FIG. 1, scalable production test system 120 includes a predictive load builder 590 for generating predictive test loads. In addition to playing production data as captured, the predictive load builder has the capability to process the production data in accordance with modifications into a predictive data load using a clustering analysis. Although modifications can alter various aspects of the captured production data, such as changing ratios of the types of production request data or increasing the rate of the production request data, the clustering-based approach employed by predictive load builder 590 that starts with production request data preserves real-world patterns and transaction relationships that would not be reflected in artificially generated data loads In various embodiments, the predictive load builder 590 vectorizes production request data into vectors suitable for clustering. In some embodiments, the predictive load builder 590 analyzes the vectors and determines cluster definitions from clusters of the vectors. The production request data may be processed (e.g., by predictive load builder 590) according to the cluster definitions and any modifications specified by a specification. The cluster definitions are determined from analysis of the vectors. The cluster definitions may then be applied to the production request data to process the production request data into a predictive data load. Cluster definitions facilitate modifying the production request data in to a predictive data load while preserving real world characteristics of the captured production request data.

The production request data may be organized in data store 130 according to time intervals (e.g., minutes) of standard timeframes (e.g., days). In some embodiments, production request data store 130 stores production request data for a given segment of time. In various embodiments, a segment is one or more intervals of time. The one or more intervals of the segment may or may not be contiguous when there are plural intervals. For example, a single segment may include 10:05 AM to 10:10 AM as well as 3:45 PM to 4:15 PM without including the intervening time between 10:10 AM to 3:45 PM.

In some embodiments, a segment of captured production request data may be maintained in data store 130 for a limited amount of time, such as a two week rolling window, for example. In addition, data from time periods of interest may be kept indefinitely. A time period of interest may be a peak sales day for a retail business or a time period with a significant increase in traffic on a social media or news website. This will be discussed in further detail in the FIGs. below.

In some embodiments, data store 130 includes, but is not limited to, solid state storage, one or more disk drives, multiple disk drives configured as a RAID system, network-based storage devices, databases, and/or a cloud computing resource.

In some embodiments, scalable production test system 120 is configured to test network-based production service 100 with a predictive data load of production request data from data store 130. The production request data is captured production client request data from actual client requests to the production service, in some embodiments. In various embodiments, the production request data is vectorized into vectors and cluster definitions are determined from the vectors. In some embodiments, the production request data is rearranged by using the cluster definitions according to specified modifications to form a predictive data load. Scalable production test system 120 replays the predictive data load from production request data store 130 to network-based production service 100 to test network-based production service 100. The production data requests of a particular time period of the predictive load is replayed to network-based production service 100 in addition to ongoing client requests from client 100, in some embodiments. In other embodiments, the production request data from different time periods is combined to create a more stressful test. For example to simulate a given time period of client requests, the production request data from the predictive data load from a particular time period or that exhibit a profile of interest may be replayed to production service 100. As an alternate example, scalable production test system 120 may scale the tests to stress network-based production service 100 by merging production request data from similar standard time periods (e.g., from multiple days) captured at a particular time interval into a single test for the standard time period. Merging the production request data of the predictive data load may create a stress test for network-based production service 100 in order to determine network-based production service 100's response to the simulated quantity of requests. In some embodiments, merging is performed according to the test plan while in other embodiments, merging is performed while processing the production request data into a predictive load. This will be discussed in further detail below.

Network-based production service 100 may be a network-based storage service, for example. On a minute by minutes basis any given number of clients may store or request data from the network-based storage service. To ensure that the network-based storage service can respond to large amounts of client requests, the network-based storage service may be stress tested with client data that has been previously captured. The scalable production test system 120 may store all of the client traffic on a minute by minute basis during a one week window. To stress (e.g., test) the network-based service, the stored client traffic (e.g., the predictive data load) is replayed real-time with current client traffic (e.g., store and request for data). The response of the network-based storage service can be monitored to ensure that the response is as expected. As another example, the production request data from the predictive data load may be combined to create a more stringent stress test. For example, production request data from three separate days may be combined to create a single test. The combined production request data may simulate a peak period of client requests to the network-based service, for example.

Figure 2:
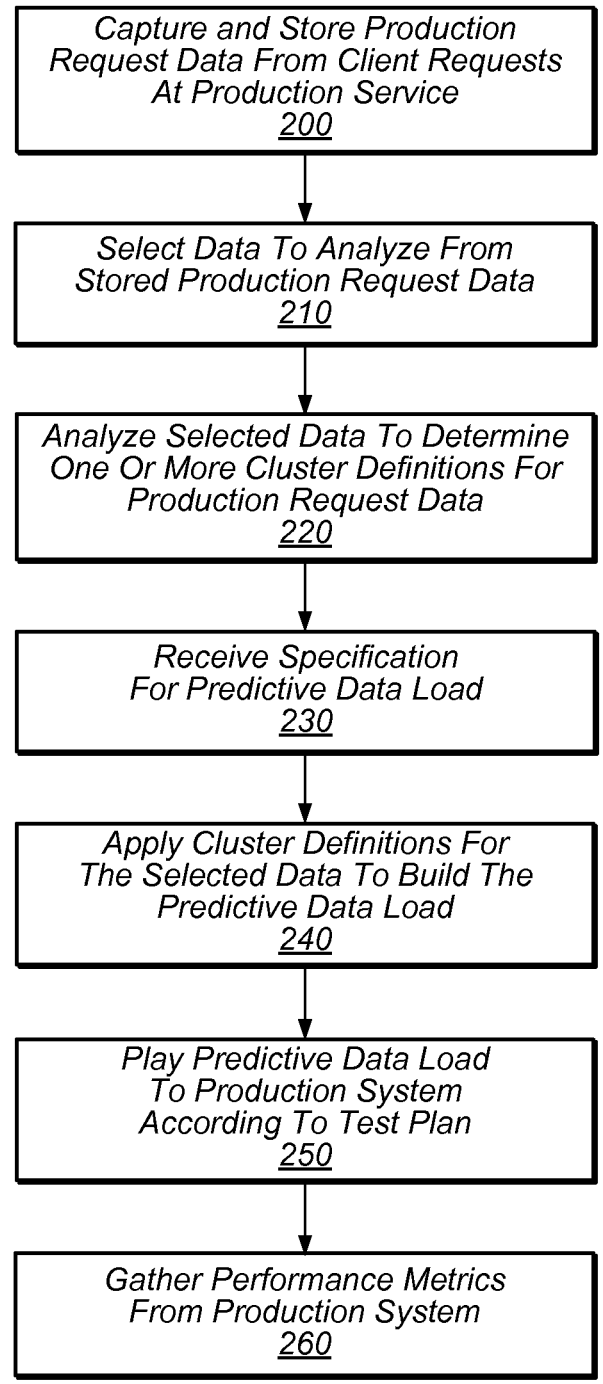
FIG. 2 is a flowchart of a method for scalable testing using a predictive data load created from production request data, according to one embodiment.

FIG. 2 is a flowchart of a method for implementing predictive load testing, according to some embodiments. In general, during normal operation of the production service (e.g., network-based production service 100 in FIG. 1) data from client requests are captured, stored, analyzed, processed into a predictive data load, and played to the production service according to a test plan. Performance metrics that measure the response of the production server 100 to the predictive data load may be gathered while the predictive data load is played.

As indicated in 200, the production request data from client requests at the production service (e.g., network-based production service 100 in FIG. 1) are captured and stored. In some embodiments, the production request data may be stored with metadata describing an aspect of the production service and timing information corresponding to the client request. For example, metadata may include information about the webpage accessed, the geographic location of the request or other unique identifiers that may be filtered during test. In some embodiments, the production request data is encrypted to maintain the security of the client data. Further details will be provided in subsequent figures.

The client requests are captured on an ongoing basis and stored in standard time intervals (e.g., minutes), in some embodiments. In addition to processing the requests in network-based production service 100, the client requests are captured on an ongoing basis as a low level or background task in order to avoid interfering with client services. Capturing the client requests for subsequent use allows for testing the network-based production service with real-world scenarios. As discussed above, a network-based production service may be a service such as on-line retail, web-hosting services, on-line image processing, brokerage firms, remote data storage, email services, cloud computing or storage, and/or social media websites. Thus, data from client requests may be information posted to a social media websites, photos requested from an on-line image processing website or requests for product pages at an on-line retail website, for example. Client requests to the production service may be captured without interfering with normal processing of the client requests by the production service. The captured data is sufficient to subsequently replay the client request to simulate an additional production load on the production service.

As indicated in 210, data from the stored production request data is selected for analysis. For example, data over a segment (e.g., one or more time intervals) may be selected or data from particular machines or systems may be selected. In one example, data from a system directed to providing services for a particular country may be selected. For example, the production request data may have a plurality of fields such as a transaction-type field, a source IP address field, a destination address IP field, a time stamp field, a browser ID field, etc. Analysis (automated or manual) of the production data with respect to the fields may reveal groups (clusters) that the production request data naturally form.

In some embodiments, each of the requests (or some subset of the requests) of the stored production data may be reduced to a common set of fields for analysis. In some embodiments, reducing the number of fields of the production requests facilitates more efficient computer processing of the data later on. In some embodiments, a graphical display of the production requests displays the production request data (or a relatively small sample segment of the production request data) such that an operator may more easily select a particular set of fields to use in the reduction of a larger segment of the production request data. Some of fields may be selected because they form more discernible groups than others, for example. Some of the fields may be selected because they show the greatest variability.

Figure 6:
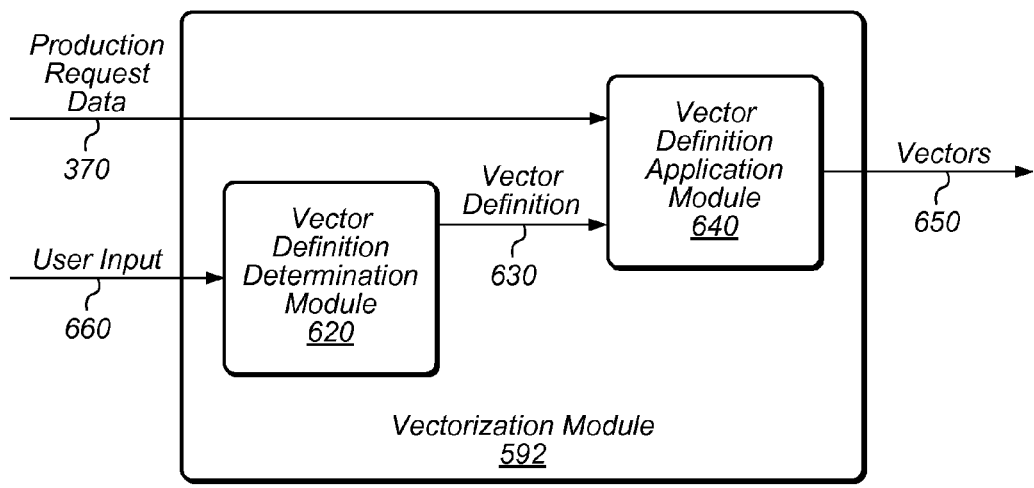
FIG. 6 is a data flow diagram of a vectorization module in accordance with various embodiments.
Figure 7:
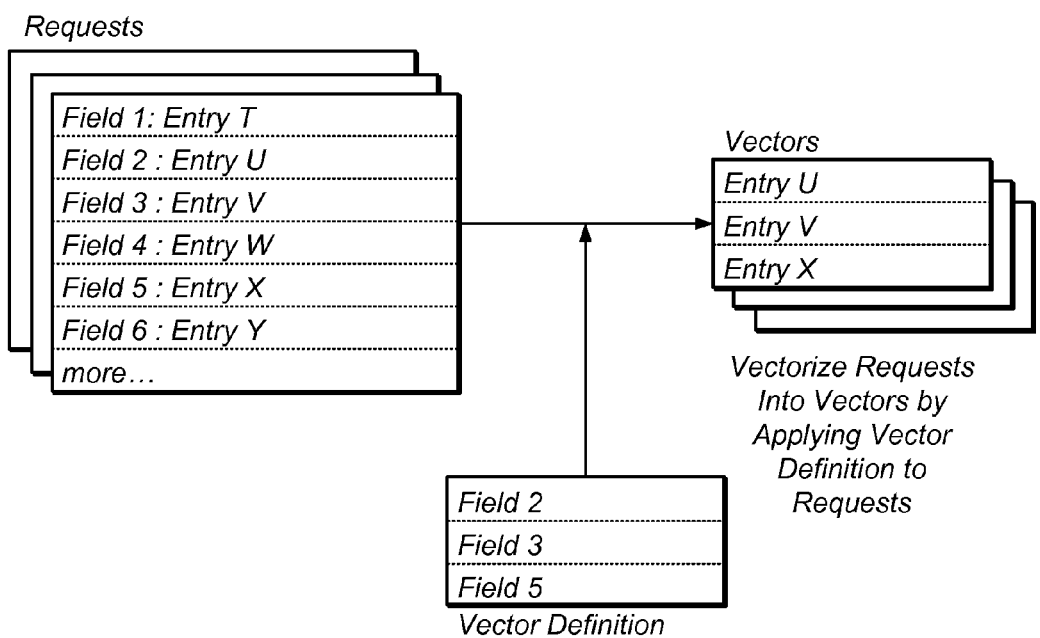
FIG. 7 is a data flow diagram of vectorization in accordance with some embodiments.
Figure 8:
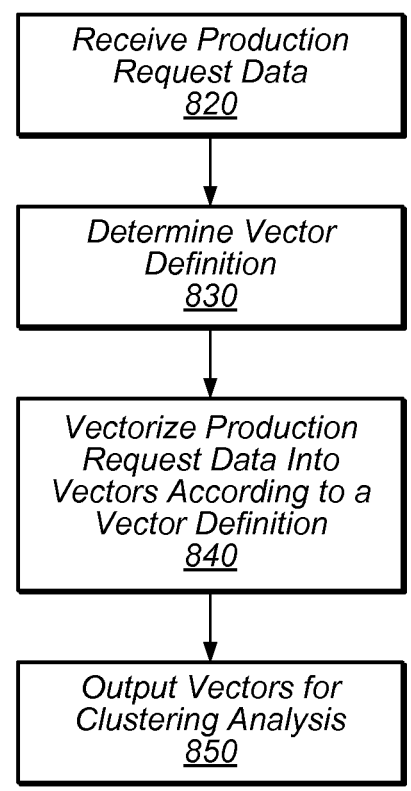
FIG. 8 is a flowchart illustrating a method of vectorization of production request data in accordance with some embodiments.

In various embodiments, selecting the data to analyze includes vectorizing the production request data, as illustrated in FIGS. 6-8 and described below. As indicated in 220, in some embodiments, the selected data (e.g., vectors) are analyzed to determine one or more cluster definitions to be used for processing the production request data into a predictive load. For example, selected data may be analyzed with a clustering algorithm to determine cluster definitions that define clusters of the data. In some embodiments, determining the cluster definitions includes setting the cluster definitions to the equivalent of the centroids determined by the clustering analysis, as described below with reference to FIGS. 9-12. Cluster definitions may be set according to a received specification as well.

As indicated in 230, in some embodiments, a specification specifying the predictive data load may be received. The specification may indicate a desired mixture of the production request data that is different from the actual captured production request mixture. For example, for a particular cluster of an interval, the network-based production service 100 may exhibit 90% reads and 10% puts, while the specification may indicate a predictive test load of 65% reads and 35% puts is desired. In another embodiment, the specification may indicate a desired size for one or more of the clusters of the predictive data load. For example, the specification may set a particular target value for the number of reads for a cluster defined by a particular cluster definition. In some embodiments, instead of specifying a desired mixture to achieve for the predictive load and allowing the system to determine how to achieve the desired mixture, the specification may more directly specify modifications to the production request data. For example, the specification may directly specify modification of a segment of the production request data to be doubled or that all the reads of a segment are to be deleted or that two segments are to be added together.

As indicated in 240, the cluster definitions for the selected data may be applied to build the predictive data load. For example, the cluster definitions determined in 220, above, are applied during the processing of the production request data captured in 200, above, to build a predictive data load. Building the predictive data load includes processing the production request data according to modifications specified in the specification. For example, the specification received in 230, above.

As indicated in 240, production request data is processed into a predictive data load by applying the cluster definitions. When production request data is processed according to the cluster definitions determined in 220, above, the processing may take into account modifications specified by the specification received in 230. As discussed above in regard to 230, the specification may specify modifications to the production request data such that the production request data will be combined in a certain mixture or the amount of data may be adjusted. For example, the specification may specify that the predictive data load should include two types of production request data, A and B, at a 50/50 ratio. If production request data of type A were actually represented in the captured production request data at 40% and production request data of type B were actually represented in the captured production request data at 60%, the processing of production request data into a predictive data load would modify the production request data, in accordance with the specification such that the processed data represents the desired ratio of 50% type A and 50% type B.

As indicated in 250, in some embodiments, a predictive data load is played to the production system according to the test plan. For example, playing the predictive data load may include playing the predictive data load data at a rate specified in the test plan. In some embodiments, the rate may be the same rate as that of the captured production data while in other embodiments, the rate may be less than or greater than the rate of the captured production data. As discussed above in FIG. 1, this creates a real world stress test for the production service (e.g., network-based production service 100 in FIG. 1) that will be discussed in subsequent figures.

In some embodiments, a test plan is created to simulate loads on the production service. In some embodiments, the test plan specifies particular production request data from the predictive data load and a test profile for using the particular production request data from the predictive data load to simulate a load on the production service. In some embodiments, the test plan specifies what portions of the predictive data load will be combined to create a given test profile (e.g., constant load, increasing load, etc.). In some embodiments, to determine the test profile, a controller may query the predictive test load data and, based on the query, determine that rate at which the predictive test data should be applied. Controllers in the scalable production test system may determine and implement the test plan, in some embodiments. In addition, the quantity of controllers may scale in response to the test plan. This will be described in further detail below.

Examples of test profiles specified by the test plan are a straight replay of the predictive data load data for a standard timeframe, a replay of filtered predictive data load data, and/or a combination of several standard timeframes of predictive data load data for a test during a given standard timeframe. A test plan that specifies a replay of filtered predictive data load data may filter the predictive data load data according to a given location of the production service (e.g., only requests sent to a German version of a website hosted by the production service). A combination of the predictive data load data may be created to simulate a more stressful load, for example. The predictive data load data may be re-ordered and/or combined with other predictive data load data with similar standard time intervals from different time periods to simulate peak traffic, for example. Further details of the test plan will be provided in subsequent figures.

As indicated in 260, in some embodiments, performance metrics are gathered from the network-based production service 100. For example, performance metrics may be monitored for auto-shutdown of the simulated load on network-based production service 100 (e.g., system metrics such as the number of test jobs in the job queue, the status of the jobs in the job queue (taken or untaken), the number of workers, or production service metrics). For example, too many jobs (or uncompleted jobs) in the job queue may indicate a problem with the workers being able to post the jobs to the production service at a sufficient rate. Production service metrics that may be monitored may include CPU usage, memory usage, disk usage or network usage. One or more of these metrics are compared to a predetermined threshold, in some embodiments. If one or more of the metrics exceeds the threshold, auto-shutdown may occur. A monitored metric exceeding a given threshold may indicate that usage is reaching a point where ongoing real client requests may be affected, thus auto-shutdown is necessary to avoid affecting clients and/or shutting down the production service, in some embodiments. In some embodiments, auto-shutdown will delete the job queue, the workers, jobs from the queue, and/or the controllers to stop simulation of the load on the network based production service 100.

Figure 3:
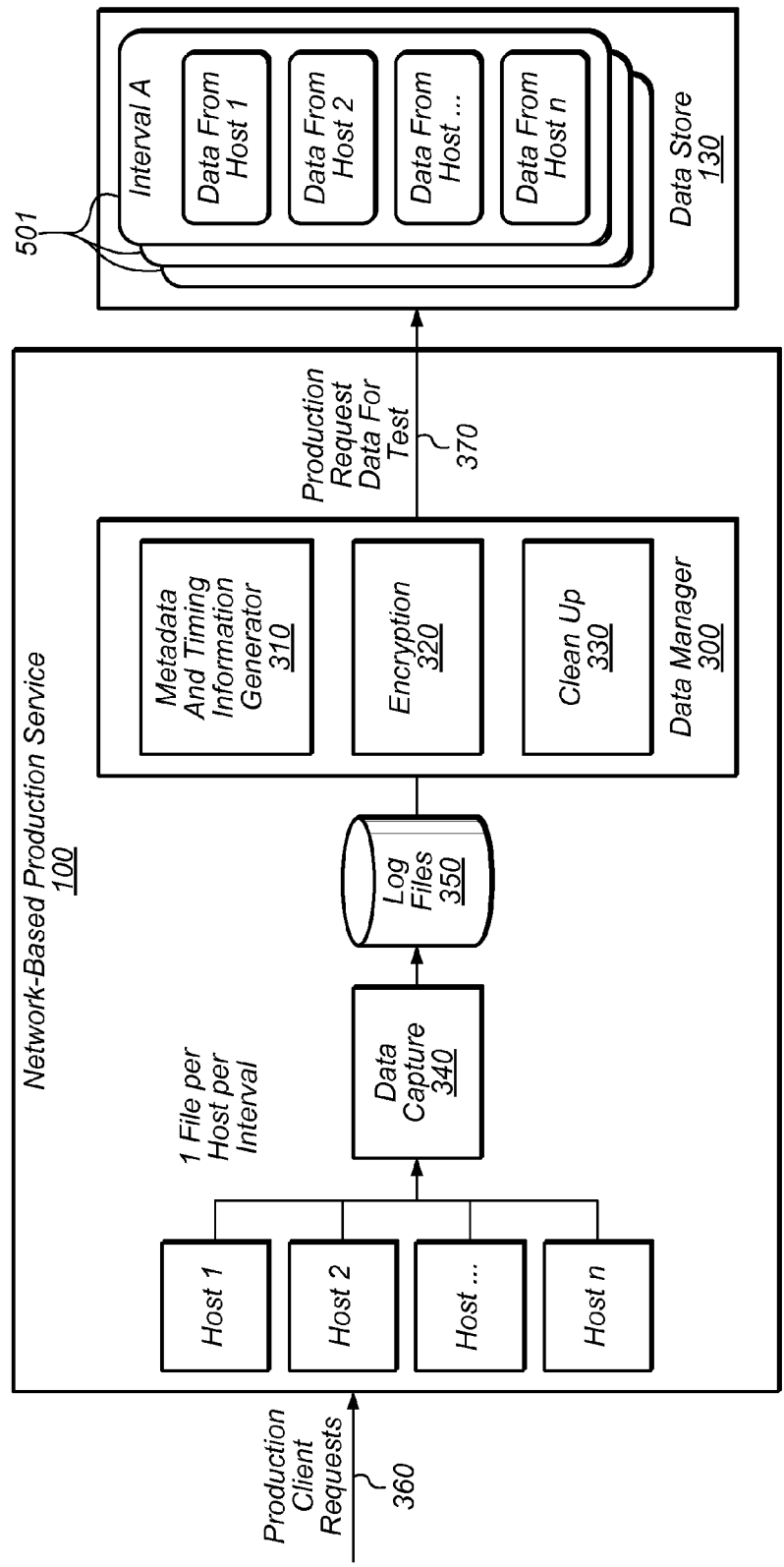
FIG. 3 illustrates a configuration for capturing production request data, according to one embodiment.

FIG. 3 illustrates a configuration of network-based production service 100 for capturing production request data, according to one embodiment. As discussed above, network-based production service 100 may be any type of network-based service, such as on-line retail, remote computing services, and/or image/web hosting service, for example. Network-based production service 100 receives production client requests 360. Examples of production client requests (e.g., received from client(s) 110 in FIG. 1) are requests for one or more web pages viewable from a web-based browser, uploading one or more images to an online image processing business, and/or accessing a remotely implemented computing environment. Network-based production service 100 may receive thousands or even millions of production client requests 360 per day, for example. To implement scalable testing of the production system, in some embodiments, a system may be provided to capture the production client requests, log the client requests and manage the production request data. The production client requests 360, received by Host(s) 1, 2 . . . n may be captured by a data capture module 340 and stored in log files 350. In some embodiments, capturing the client request data is a low priority task so that client traffic within network-based production service 100 is not affected. A data manager 300 tags the captured production client requests 360 with metadata, encrypts the tagged data, and manages the cleanup of data. Data manager 300 includes, in some embodiments, a metadata and timing information generator 310, and encryption module 320, and a clean up module 330. The metadata and timing information generator 310 generates the metadata and timing information associated with the production client requests 360 to produce production request data 370. In some embodiments, the production client requests, the metadata and/or timing information are encrypted by encryption module 320 prior to storage in data store 130 as production request data 370. The data manager also includes a cleanup mechanism 330, in some embodiments, to remove old production request data for test from data store 130. In various embodiments, production request data 370 is stored in data store 130 in files 501 per time interval.

In some embodiments, data capture module 340 captures the production client requests 360 received at network-based production service 100. In some embodiments, data capture module 340 captures the production client data as a low level task without interfering with the production service mechanisms for responding to the same client requests (e.g., requests from clients 110 in FIG. 1). Data capture 340 writes production client requests 360 to log files 350 according to predetermined standard time intervals (e.g., minutes). For example, each production client request 360 received may be captured by data capture module 340 and written to log files 350. In other embodiments, only a portion of client requests may be captured. Capturing and storing actual client requests provides real world data for use during testing of network-based production service 100.

In some embodiments, data manager 300 tags the production data (e.g., captured production client requests) from the log files with metadata describing an aspect of the production service to which production client request 360 pertains and timing information (e.g., date and time of the client request), encrypts the tagged log files, and cleans up the stored production data for test. Metadata and timing information generator 310 tags the production data in each log file saved for a given time interval (e.g., each minute) and adds production-service specific metadata and timing information to the production client request in the log file. For example, the timing information may be a date and time for the capture of a production client request 360. The metadata describing aspects of the production service may include the page ID for a webpage or a country location (e.g., the Canadian version of the website), for example. As another example, some production client requests may be tagged to identify it as a special test to be kept outside a cleanup process. Clean up module 330 may automatically remove old data from data store 130, in some embodiments. Tags may be used to identify the expiration date for the stored production request data, for example. For example, production request data from a peak service day such as Cyber Monday may be kept outside of a cleanup process that maintains a two week rolling window. The data from this peak service day may be used as a specialized stress test of network-based production service 100.

In some embodiments, encryption module 320 encrypts the production client request data from the log files 350, the metadata, and the timing data prior to storing in data store 130. In various embodiments, this ensures that the real world data used for scalable testing of network-based production service 100 is not compromised during storage and reuse. In some embodiments, encryption module 320 or another module may compress the data to be stored in data store 130 to minimize storage and data transmission requirements. In other embodiments, the data may be compressed at data store 130 or by another component.

In some embodiments, clean up module 330 removes old production data for test from data store 130. In some embodiments, production request data for test may be stored for a particular time period. In some embodiments, the production request data 370 for test may have an expiration date and it is removed during a daily process to clean up or remove data from data store 130. For example, data may be captured, stored and removed to maintain a two week rolling window of production request data. As discussed above, some specialized data may be tagged so that it is not removed during regular clean up processes.

Although FIG. 3 illustrates data capture module 340, log files 350, and data manager 300 as being provided within the production service, in other embodiments client request data may be captured external to the production service, such as at a gateway router to the production service, without interfering with the flow of client requests to the production service.

Figure 4:
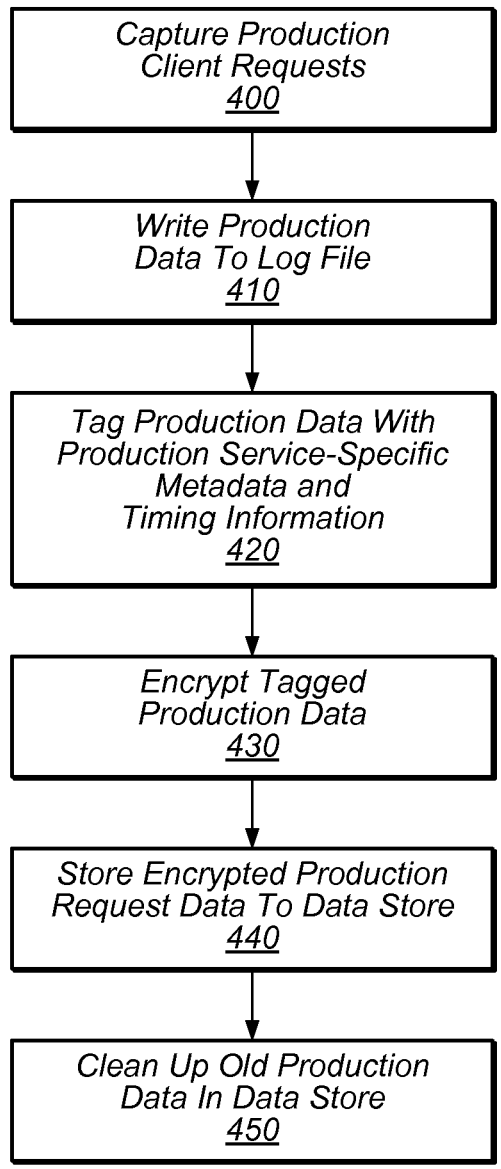
FIG. 4 is a flowchart for capturing, tagging, encrypting, storing and cleaning up production request data, according to one embodiment.
Figure 15:
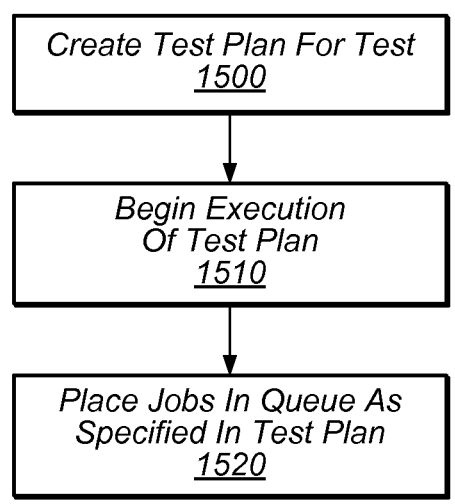
FIG. 15 is a flowchart of a method for implementing a test plan, according to one embodiment.

FIG. 4 is a flowchart of a method for managing production request data, according to one embodiment. The flow chart depicts a general flow of capturing and managing production client request data. The flow chart depicted may be performed by the system illustrated in FIG. 3. In general, when capturing production client requests (e.g., production client requests 360, in FIG. 3), the data is identified, stored and/or managed to facilitate reuse as indicated by a test plan (more about the test plan is illustrated in FIGS. 15 and 16, described below). The captured data (e.g., captured by data capture module 340) is written to log files (e.g., logs files 350 in FIG. 3). The captured data in the log files is tagged in a metadata and timing information generator 310 in some embodiments. The tagged production data is encrypted by an encryption module (e.g., encryption module 320 in FIG. 3) prior to storage in data store 130. In some embodiments, the tagged production data is compressed. In addition, a cleanup module (e.g., cleanup module 330 in FIG. 3) may remove old production data from data store 130.

As indicated in 400, production client requests are captured. For example, the production client requests 360 may be captured on an ongoing basis by a data capture module 340 in FIG. 3. The captured data may be stored at predetermined standard time intervals such as one minute intervals (illustrated in log files 350 in FIG. 3, for example). Examples of production client requests are client requests for product pages at an online retail website, posts to a social media website, uploaded and/or downloaded images from an image processing website, and/or applications and data from a shared computer site.

As indicated in 410, the captured production client requests are written to log files (e.g., log files 350 in FIG. 3). As indicated in 420, in some embodiments, the logged production client requests are tagged with production service specific metadata and timing information. For example metadata and timing information generator 310 in FIG. 3 may perform tagging of the production data in the log files. The timing information indicates the time and date associated with the captured production data. The production specific metadata comprises details corresponding to aspects of the production service (e.g., network-based production service 100 in FIG. 1). Examples of metadata are webpage IDs and/or location information. In addition, in some embodiments, the metadata or timing information corresponding to the tagged production request data includes identifiers indicating production data of interest corresponding to a given time period. For example, Cyber Monday for an online retail website or tax filing day on a tax preparation website provide production data representative of peak traffic time periods on the production service.

As indicated in 430, in some embodiments, the tagged production request data is encrypted. For example, an encryption module such as encryption module 320 in FIG. 3 may encrypt the data to protect the client data while it is stored for reuse. In some embodiments, the data is compressed in addition to encryption. As indicated in 440, in some embodiments, the encrypted tagged production request data is stored in a data store (e.g., data store 130 in FIG. 1) as production request data. The amount of time the encrypted tagged production request data is stored in the data store is predetermined, in some embodiments. As indicated in 450, in some embodiments, the old production data in the data store is cleaned up. In some embodiments, the tagged production data may have an expiration date to facilitate automatic cleanup, e.g., by cleanup module 330 in FIG. 3. For example, data may be kept for a two week rolling window. In alternate embodiments, the clean up mechanism may review the tags corresponding to the stored encrypted production data to determine if data should be kept. To keep the production data of interest (e.g., Cyber Monday described in 420), the time may be set to a date far in the future (e.g., after the next Cyber Monday), in some embodiments.

Figure 5:
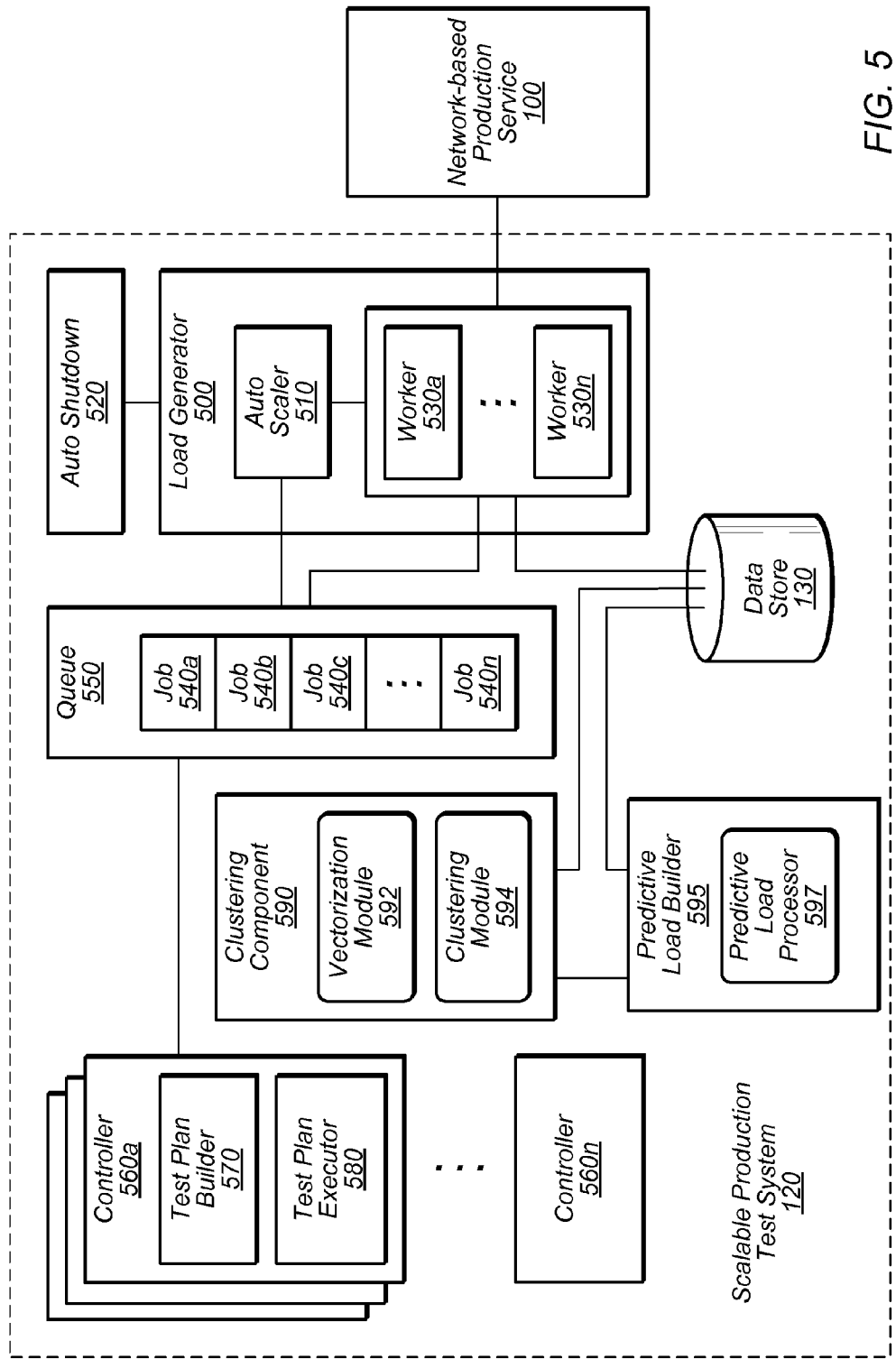
FIG. 5 illustrates a configuration of a scalable production test system, according to one embodiment.

FIG. 5 illustrates a configuration for a scalable production test system, according to one embodiment. In general, a scalable production test system 120 is configured to create a predictive data load, test a network-based production service 100 with the predictive data load and monitor the network-based production service 100 during the test. Components of the scalable production system include a clustering component 590 for selecting and organizing production request data, a predictive load builder 595 for building predictive loads from the reorganized production request data such that the data is useful for testing the network-based production service 100, controller(s) 560 for creating and executing test plans, queue 550 for receiving test jobs from the controllers according to the test plan and load generator 500 for generating the load using the test jobs.

Some of the embodiments disclosed herein include encrypting production request data. For example, embodiments directed towards network-based production system 100, illustrated in FIGS. 3 and 4 that include encryption module 320 and encryption of the tagged production data (block 430). It is contemplated that for various embodiments, for example where clustering component 590 and predictive load processor 597 access stored production request data and predictive load processor stores a predictive data load, the production request data and/or the predictive request data may be encrypted. These embodiments are contemplated and do not depart from the scope of the invention. For various embodiments, and as needed, encrypted data may be decrypted and unencrypted data (e.g., production request data) may be encrypted. Other embodiments may not include encryption and decryption of the production request data.

In various embodiments, clustering module 594 and vectorization module 592 are part of clustering component 590, as illustrated in FIG. 5. In other embodiments, clustering module and vectorization module 592 may be part of predictive load builder 595. However, various other configurations are possible without departing from the scope of the invention. For example, vectorization and clustering may be performed "off-line," at another time, or by another system.

Clustering component 590 includes components for turning production request data into vectors that can be analyzed to determine cluster definitions that are used in the processing of the production request data. For example, vectorization module 592 may vectorize production request data into vectors using a vector definition. Also, clustering module 594 may analyze the selected data to determine one or more cluster definitions for the production request data. Cluster definitions are illustrated in FIG. 7, and described, below. Clustering module 594 may analyze vectors that are received (either from data store 130, or directly from vectorization module 592) to determine cluster definitions. Exemplary cluster definition determination is illustrated in FIGS. 9-12, described below.

Predictive load processor 597 may receive the determined cluster definitions from the clustering module 594 and process the production request data into a predictive data load based on the cluster definitions. In various embodiments, modification may be made during the processing of the production request data. For example, percentages or sizes of clusters over a segment may be modified to achieve a desired mixture during processing of the production request data according to the cluster definitions. The predictive load processor may store the predictive data load to data store 130.

Additionally, the scalable production test system may include one or more controllers 560 including a test plan builder 570 and/or a test plan executor 580, for example. The test plan builder may determine the test configuration and the production data required for a test, for example. The test executor 580 may submit jobs to a queue 550 according to the test plan, for example. In some embodiments, a load generator 500 instantiates workers to retrieve jobs from the job queue and post to the network-based production service 100. An auto-scaler 510 may scale the workers in response to metrics such as the quantity of jobs in the job queue, for example. An auto-shutdown mechanism monitors metrics to determine, based on the metrics, whether shutdown of the components implemented to simulate a load on network-based production service 100 is required, in some embodiments. Scalable production test system 120, in some embodiments, may be implemented at a same entity as network-based production service 100. In alternate embodiments, scalable production test system 120 is implemented separately from network-based production service 100. In some embodiments, scalable production test system 120 may be provided as a separate service from production service 100. For example, at least some portions of scalable production test system 120 may be provided as a network-based service (e.g., third party service) remote to production service 100.

One or more controllers 560 are implemented to create and execute a test plan to simulate a load on production service 100. A test plan specifies the portions of the predictive data load that will be replayed to production service 100. A test plan may also, or, alternatively, specify re-ordering of the data to achieve a given test profile, for example. A test profile of the test plan describes the simulated load for production service 100. For example, a test profile may be an increasing/decreasing load, a constant load and/or a peak load. Controller 560 includes test plan builder 570 and test plan executor 580 as illustrated in controller 560*a*, in some embodiments. Test plan builder 570 in controller 560*a* queries data store 130 to evaluate available data for a test plan. Test plan builder 570 creates a test plan based on the available data (e.g., predictive data load data) in data store 130, and the type of testing (e.g., direct replay of data, constant load, increasing load, etc.) desired, in some embodiments. For example, test plan builder 570 may evaluate start and end times for a given time period (e.g., individual minutes on a given date) and the size of the file corresponding to the data to determine the ordering of the predictive data load data in the test plan, in some embodiments. In some embodiments, the test plan specifies a test profile that defines the rate and/or rate profile at which one or more controllers add jobs to the job queue. For example, data store 130 may be queried by test plan builder 570 to determine the number of files (e.g., for the predictive data load) and the size of the files for a given minute, as indicated by start and stop times, on a given date. Test plan builder 570 may query the same information over an hour or a day, for example, to determine the rate that the load is applied to network-based production service 100 during test. As another example, to stress (e.g., create a peak traffic test) network-based production service 100, several days-worth of predictive data load data may be combined to create a peak traffic test plan for a given test day. The predictive data load data may be combined for a standard timeframe from different standard timeframes to create a test load for the standard timeframe test larger than any of the individual timeframe loads, in some embodiments. For example, if the stress test were to determine the load to simulate peak traffic, test plan builder 570 may query the predictive data load data in the data store 130 to determine the number and size of the files to create the desired load. In some embodiments, scalable production test system may provide an interface to allow a test administrator, for example, to specify the desired parameters for a given test. One or more controllers may receive the parameters via the interface and build an appropriate test plan.

In addition, in some embodiments, test plan builder 570 may query data store 130 for a sufficient amount of predictive data load data to create specific test profiles. A test profile may also be described as the rate at which predictive data load data is replayed to the network-based production service 100, for example. An example of a test profile may be a straight replay of data for a given time period (e.g., a day). In other embodiments, the test plan creates a constant load, where the predictive data load data for a given time period is averaged out. In other embodiments, the load is an increasing load where the predictive data load data steadily increases or spikes suddenly. Alternatively, in some embodiments, the test profile is a decreasing load where a large amount of predictive data load data is initially replayed and the amount steadily decreases. Finally, any combination of the above described test profiles can be created by test plan builder 570 to stress network-based production service 100, in some embodiments. The test profiles will be discussed in further detail in subsequent figures.

Test plan executor 580 generators jobs to carry out the test plan, in some embodiments. In some embodiments, test plan executor 580 in controller 560 implements the test plan created by test plan builder 570. Test plan executor 580 creates jobs and submits the jobs to the job queue in queue 550. Test plan executor 580 maintains the rate required to create the load profile in network-based production service 100 as specified by the test plan. In some embodiments, each job 540 that test plan executor 580 creates includes a link or pointer to the portion of production request data in data store 130 as indicated in the test plan. Test plan executor 580 may also include instructions in jobs 540 for workers 530 as indicated by test plan builder 570, in some embodiments. Each job 540 specifies production request data (e.g., predictive data load) to be replayed by workers 530 to network-based production service 100.

In some embodiments, production test system 120 is configured to scale the number of controllers based on the size of the load to be simulated on production service 100. The number of controllers is scaled in response to the test plan. If the test plan indicated a large load, for example, that requires more than one controller for implementation the test plan, then controllers may be added to meet the demand of the test plan. In some embodiments, additional controllers 560 are implemented to complement the controller that created the test plan when executing the test plan. For example controller 560*a* includes test plan builder 570 and test plan executor 580. Based on the test plan created, more controllers may be needed to execute the test plan, in some embodiments. The additional controllers 560*n* are implemented to provide additional resources to create and submit jobs 540 to queue 550. For example, if the test plan created by test plan builder 570 in controller 560*a* has created a test profile including multiple days' worth of data, a separate controller may be required to create and submit jobs 540 for each days worth of data. In addition, in some embodiments, controllers 560 are implemented with test plan builder 570 and test plan executor 580 on separate controllers.

In some embodiments, queue 550 is implemented to receive jobs from the controllers and provide workers 530 jobs to replay to production service 100. Queue 550 identifies the status of jobs and provides a centralized point for determining the resources to complete the jobs. For example, the status of the jobs and the quantity of jobs in queue 550 may be used to determine whether to scale resources such as workers. Queue 550 may be implemented in scalable production test system 120 as illustrated in FIG. 5. In alternate embodiments, queue 550 is implemented separate from other components of scalable production test system or by a third party resource. Queue 550, accepts and manages jobs 540 from test plan executor 580 in controller 560. As jobs 540 are accepted from queue service 550, the status of each job (e.g., test job) is indicated by marking the job "taken" or "invisible", in some embodiments. "Taken" jobs 540 remain in the queue to ensure that in the event of a failure to complete job 540, job 540 is made available again in the queue, in some embodiments. Marking jobs 540 as "taken" or "invisible" ensure that once a job is accessed from queue service 550 by a worker 530, another worker 530 may not perform the "taken" job. Jobs 540 may become available again (e.g., marked "untaken" or "visible") if they are not marked complete prior a predetermined timeout, for example. For example, jobs 540 currently in progress in network-based production service 100 may be marked as "untaken" or "visible" if job 540 fails to complete. Job 540 may fail to complete due to worker failure, production service 100 failure, and/or network failure, for example.

In some embodiments, load generator 500 is provided to carry out jobs from the job queue to implement the test plan. In some embodiments, load generator 500 provisions workers to execute the jobs, scales the number of workers in response to metrics, and/or shuts down the test load on production service 100 in response to metrics. In some embodiments, load generator 500 comprises one or more workers 530, an auto-scaler 510 and auto-shut down module 520. Load generator 500 implements workers 530 in response to the test plan and scales the workers with auto-scaler 510 in response to metrics assessed on the job queue. For example, the status of the jobs in the job queue may indicate the need for more workers. Load generator 500 monitors system metrics with auto-shutdown 520. These modules will be described in further detail below.

In some embodiments, a worker 530 accesses the next available job 540 from queue 550. Available jobs are marked as "untaken" in the job queue 550. Worker 530 accesses the predictive data load data from data store 130 as indicated by the job and replays the predictive data load data to the production service. In some embodiments, a worker 530 is generic such that any implemented worker can access any untaken job, regardless of the nature of the test plan and/or production service. When a worker 530 accesses a job (e.g., test job) from queue 550, the job 540 is marked as "taken" and that job 540 is ineligible to be taken by other workers 530, in some embodiments. However, as discussed above, a job 540 remains in queue service 550 until completed. After a predefined amount of time has elapsed without a "taken" job being completed, the job may again be marked as "untaken" and become available for a worker 530 to access. Worker 530 retrieves the predictive data load data from data store 130 indicated by job 540. Worker 530 decrypts the predictive data load data from data store 130 and applies any instructions from job 540 to the decrypted predictive data load data. An example of an instruction may be transforming the date and time of the production data of the predictive data load to the current date and time prior to posting job 540 to network-based production service 100. Worker 530 then replays the predictive data load data to network-based production service 100.

In some embodiments, auto-scaler 510 scales the number of workers 530 in response to metrics. The quantity of workers 530 implemented by load generator 500 may scale up or increase in response to one or more metrics. The quantity of workers implemented by load generator 500 may scale down in response to one or more metrics. In addition, workers may be scaled separately from the controllers implementing the test plan. For example, controllers may scale in response to the quantity of jobs that will be submitted to the job queue 550, whereas workers may be scaled in response to the quantity of jobs already in job queue 550. In some embodiments, the metrics for determining scaling of workers 530 are one or more job quantity metrics and/or one or more worker load metrics. A job quantity metric monitors the quantity of jobs 540 in queue 550; in response to the quantity of jobs exceeding a given threshold, auto-scaler 510 may implement more workers. A worker load metric comprises monitoring system metrics such as memory usage, CPU usage, disk usage and/or network usage for the computing resource(s) used to implement the worker(s). In response to at least one of these metrics being above a threshold, more workers may be implemented by load generator 500.

In addition, in some embodiments, auto-scaler 510 scales (e.g., increases or decreases) the implementation of workers 530 in scalable production test system 120 in a predictive manner. In some embodiments, since the test plan is known and the available predictive data load data for replay is known, auto-scaler 510 can look ahead at the plan or the predictive data load to determine how to scale workers 530. For example, in response to the look ahead, auto-scaler 510 schedules an increase or decrease in the number of workers based on the predicted change according to the test plan. Auto-scaler 510 can scale workers 530 in advance of or concurrently with controller 560 and/or test plan executor 580 creating and submitting jobs 540 in queue 550. For example, if there are currently 800 workers and twenty minutes from now the load will increase by 10%, 80 more workers may be initiated (e.g., gradually) in preparation for the increase in load. Conversely, if the load will decrease by 10% in the near future, 80 workers may be slowly decommissioned.

In some embodiments, auto-shutdown module 520 is implemented to monitor and preserve the health of network-based production service 100 and/or other computing resources used to carry out the test. Auto-shutdown module 520 is configured to monitor one or more system metrics and determine whether to shut down the test load on the production service (e.g., network-based production service 100 in FIG. 1) in response to the system metrics. In some embodiments, the system metrics include the number of test jobs in the job queue (e.g., queue 550), the number of untaken jobs in the job queue and/or the number of taken test jobs in the job queue. In some embodiments, auto-shutdown 520 compares the metrics described above to a given threshold to determine if auto-shutdown is needed. In some embodiments, if the size of queue 550 grows such that workers 530 are not accessing jobs at an expected rate, auto-shutdown 520 instructs controller 560 to shut down and/or delete the queue. In some embodiments, if there are too many taken jobs 540 or too many untaken jobs in queue 550, auto-shutdown 520 instructs controller 560 to shut down and/or delete the queue. Too many taken jobs 540 may indicate that there are too many jobs applied to network-based production service 100 or that workers 530 are stalled on particular jobs posted to network-based production service 100, for example. Too many untaken jobs may be indicative that workers 530 may not be able to handle the current load, for example. In some embodiments, when a maximum number of workers is reached auto-shutdown 520 shuts down scalable production test system 120. If the maximum number of workers (e.g., workers 530) is reached and more workers 530 are necessary to complete the jobs, for example, that may be indicative of problems in scalable production test system 120. In some embodiments, the success rate of each worker 530 is monitored to determine the number of jobs handled successfully and unsuccessfully. If a certain percentage of jobs are failing in a predetermined amount of time, auto-shutdown 520 will shut down the worker. In some embodiments, workers 530 will automatically shut down in response to reaching a certain percentage of failing jobs, for example. In some embodiments, if too many (e.g., compared to a threshold) workers 530 are auto-shutdown, auto-shutdown 520 will instruct controller 560 to also shutdown (e.g., delete the job queue and stop the test). Too many workers 530 shutting down may indicate larger issues such as network problems or problems with network-based production service 100 under test, for example.

Figure 11:
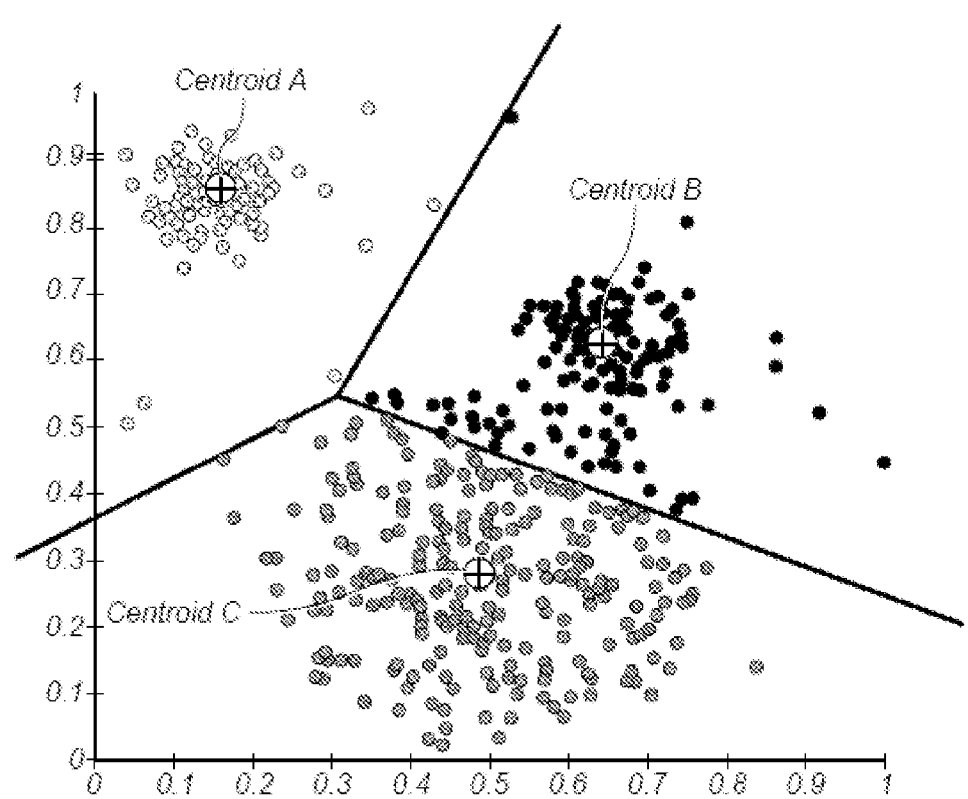
FIG. 11 illustrates clustering of production request data in accordance with some embodiments.
Figure 12:
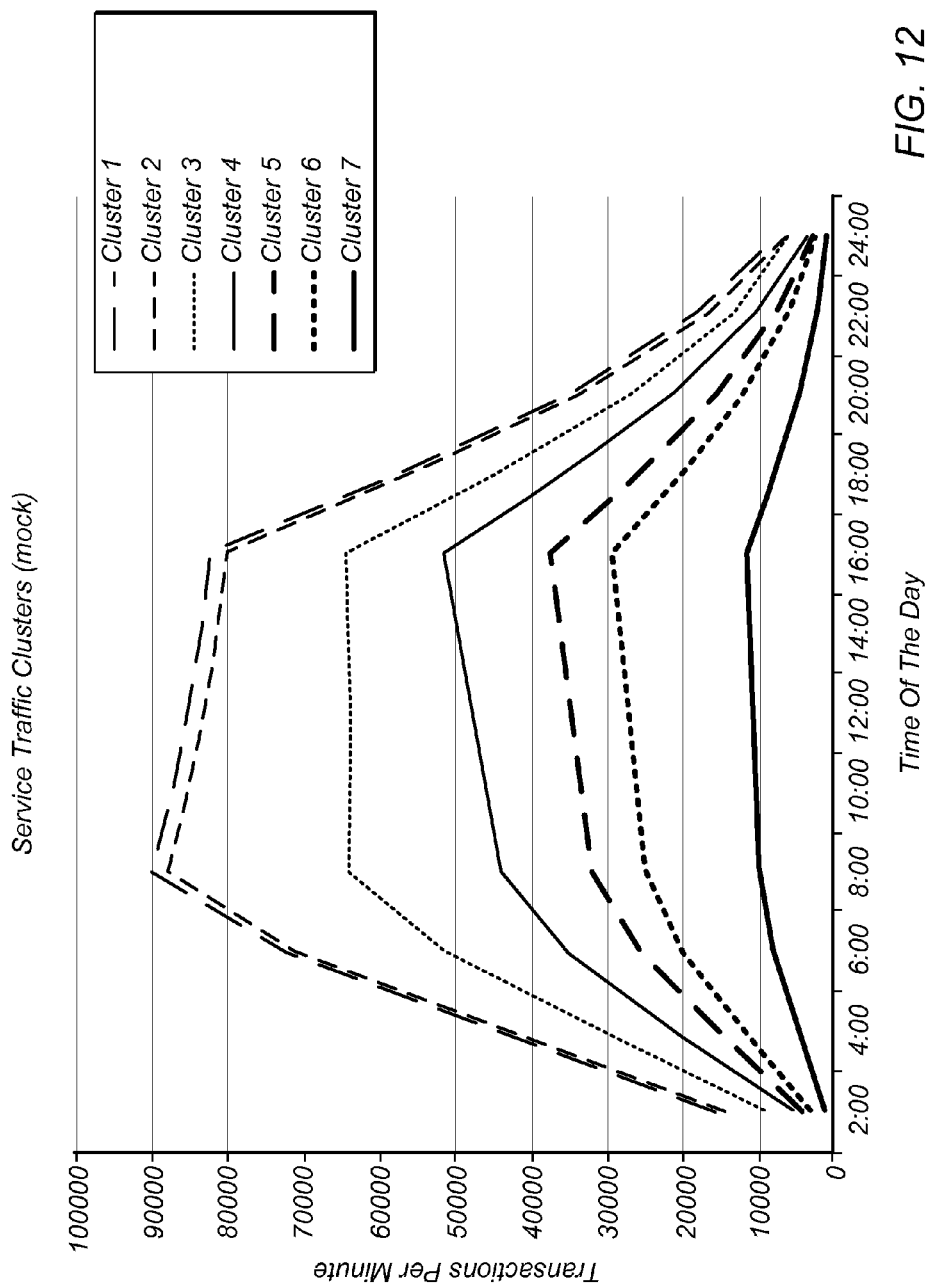
FIG. 12 illustrates a line graph of exemplary clusters according to an embodiment.
Figure 13:
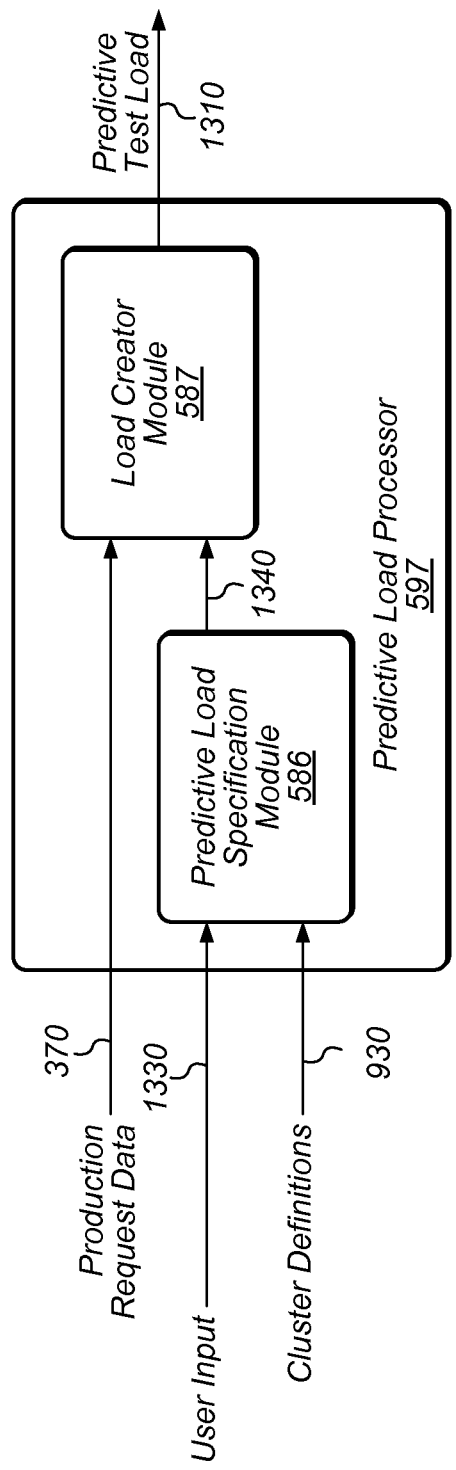
FIG. 13 is a data flow diagram of a predictive load processor according to an embodiment.
Figure 14:
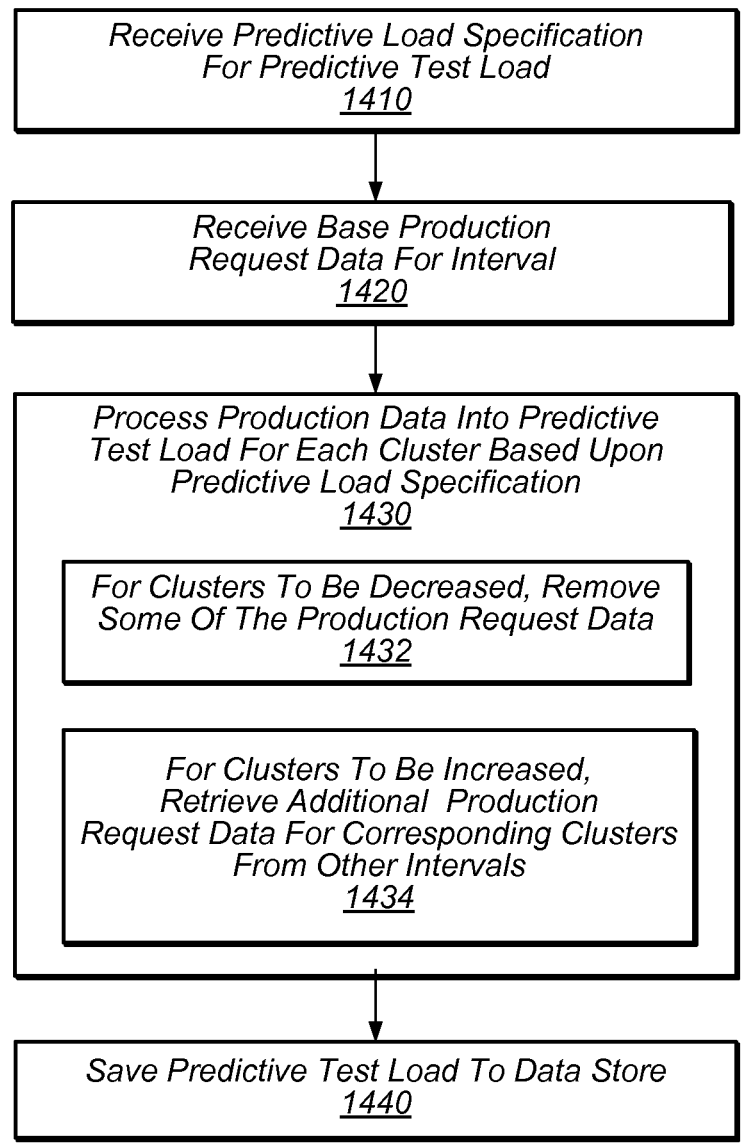
FIG. 14 is a flowchart illustrating a method of processing production request data into a predictive data load according to an embodiment.

FIGS. 6-12 are directed to clustering component 590 and FIGS. 13-14 are directed to predictive load builder 595. In some embodiments, these two components may work together to automate creation of a predictive data load from production request data.

Turning to an exemplary embodiment illustrated in FIGS. 6 and 7, vectorization module 592 takes production request data 370 and user input 660 as inputs and produces vectors 650. For example, production request data 370 may be vectorized into vectors 650 with a subset of fields compared to the fields provided in production request data. Vectorization module 592 includes vector definition determination module 620 for determining the vector definition and vector definition application module 620 for applying the vector definition to the production request data 370. The user input 660 to vector definition determination module 620 may include a specification of the vector definition directly or in other embodiments, user selection of a particular vector definition from a group of predetermined or suggested vector definitions. The predetermined vector definitions may originate from the actions of a user or system operator, at the time of configuration, or, from historic vector definitions used in prior vectorization exercises that have been saved. In various embodiments, a vector definition pre-approval method and module may analyze the production request data to determine vector definitions suitable for the data. For example, suitable vector definitions may be based upon the data fields of the production request data that exhibit the most change. In some embodiments, selection of vector definitions is based on the fields that are more descriptive. The determined vector definition 630 is passed from the vector definition determination module 620 to vector definition application module 640 where the vector definition is applied to production request data 370 to produce vectors 650.

In various embodiments, the vectors may include one or more dimensions corresponding to one or more of the fields of the production request data. In FIG. 7, the production request data (Requests) include <Field, Entry> key value pairs 1-6, etc. and the example vector definition (Vector Definition) includes Fields 2, 3 and 5. The process of vectorizing (or "vectorization") applies the vector definition to the request data to turn the data into vectors having the same dimensions as the vector definition. The vectors created by applying the example vector definition to the exemplary requests in FIG. 7 is Entry U, Entry V, and Entry X, as illustrated. Vectorization may be applied to various amounts of the production request data. For example, all of the request data may be turned into vectors, or only some portion of the request data may be turned into vectors. In some embodiments, vectoring is performed in real-time as the production requests are received at the production system.

In a particular example from an on-line translation service provided by production service such as production service 100, fields (e.g., Operation, Original word, Original Language, Target Language, Source Country, Browser, etc.) from translation requests may be translated into vectors. For example, a request to the translation service may include the following data:

| Field | Entry |
|---|---|
| Operation: | TranslateWord |
| Original Word: | "Hola" |
| Original Language: | "Spanish" |
| Target Language: | "English" |
| Source Country: | Mexico |
| Browser: | Firefox |

For the example, the vector definition includes the following dimensions from the production request data: Operation, Original Language, and Target Language. The vector created by applying the example vector definition to the exemplary request would be [TranslateWord, Spanish, English].

FIG. 8 is a flowchart illustrating vectorization of production request data in accordance with some embodiments. Production request data is received (block 820). For example, production request data may be received from data store 130 or, directly from the production service in real-time. Vector definitions are determined from analysis (block 830). For example, a user may input vector definitions through the user interface to vector definition determination module 620. The production request data is vectorized into vectors according to a vector definition (block 840). For example, as described above in regard to FIG. 7. The vectors may be output for clustering analysis (block 850). An example of clustering analysis is given below in regard to FIG. 9.

In various embodiments, the cluster definitions may vary in complexity. The cluster definitions may be adjusted to alter the granularity of the resulting clusters. For example, a cluster definition adjusted to provide greater granularity may specify that the first character of the entry should be part of the vector (e.g., if the words were kept in a tree sorted alphabetically).

Figure 9:
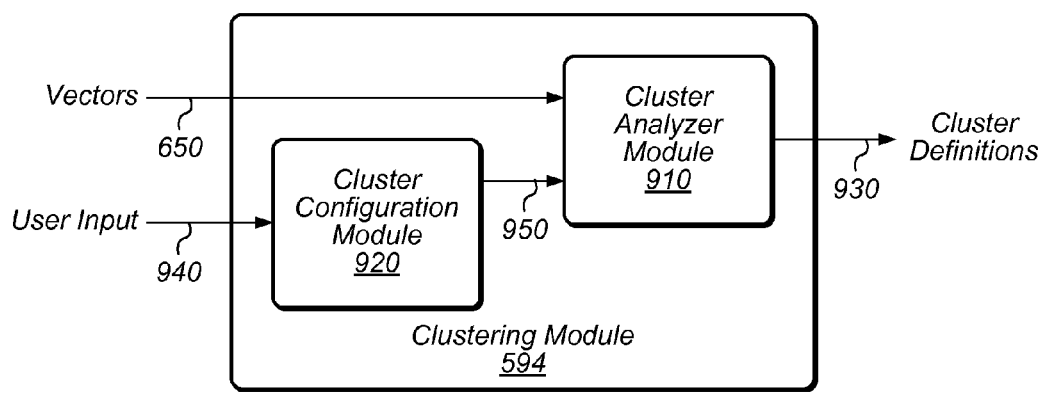
FIG. 9 is a data flow diagram of a clustering module according to various embodiments.

FIG. 9 is a flowchart illustrating a method of determining cluster definitions in accordance with some embodiments. Clustering module 594 takes vectors 650 and user input 940 as input and produces cluster definitions 930 as output. Cluster definitions 930 may be automatically selected, or, alternatively, specified. For example, cluster configuration module 594 may automatically select a predetermined clustering algorithm, such as the k-means algorithm, illustrated in FIG. 11, described below. In another example, cluster configuration module 920 may provide multiple clustering algorithm options for selection by a user. In yet another example, not illustrated, cluster configuration module 920 may analyze the vectors and automatically select a particular clustering algorithm that is best suited to the characteristics of the vectors. In one embodiment, cluster configuration module 920 accepts specification of the cluster definitions without clustering analysis, for example from an operator of the system. Cluster configuration module 920 passes 950 either the specified cluster definitions or the selected clustering algorithm to cluster analyzer module 910.

Cluster analyzer module 910 accepts the specified cluster definitions 950 or the selected clustering algorithm 950 as input along with vectors 650. If the cluster definitions have been specified, the cluster analyzer module outputs the specified cluster definitions as the cluster definitions 930. However, if a clustering algorithm has been specified, or if the system is configured to use a default clustering algorithm, cluster analyzer module 910 will apply the clustering algorithm to the received vectors 650 to determine the cluster definitions.

In some embodiments, it is useful to consider time intervals while clustering. It may be useful to consider that time intervals could be based on any granularity, or even multiple granularities such as minute-basis, or 10 minutes, or hourly, or daily. For example, by clustering according to a time dimension of the vectors, it may be determined that between the hours of 8 AM and 1 PM vectors grouped such that Field 2 has an entry="X" are 10% of the requests and vectors grouped such that Field 5 has an entry="Z" are 90% of the requests, but between the hours of 6 pm and 10 pm, vectors grouped such that Field 2 has an entry="X" is 5% of the requests and vectors grouped such that Field 5 has an entry="Z" is 95%. One exemplary response to such determination may be to set the granularity of time to morning and evening. As such, it may be realized that segments of clusters from various portions of the day exhibit characteristics that are better suited (for one reason or another) for use in the predictive data load. For example, data from a particular segment may be of a desirable ratio or size for the predictive data load. By adjusting the granularity of the vector cluster definitions (e.g., making the time periods smaller), and/or selecting particular intervals that emphasize particular clusters, select clusters may become so well-defined that they may be easily manipulated to match desired theoretical load types. Various other dimensions are contemplated and are suitable for vector cluster definitions tailored to suit the particular network-based production service.

Figure 10:
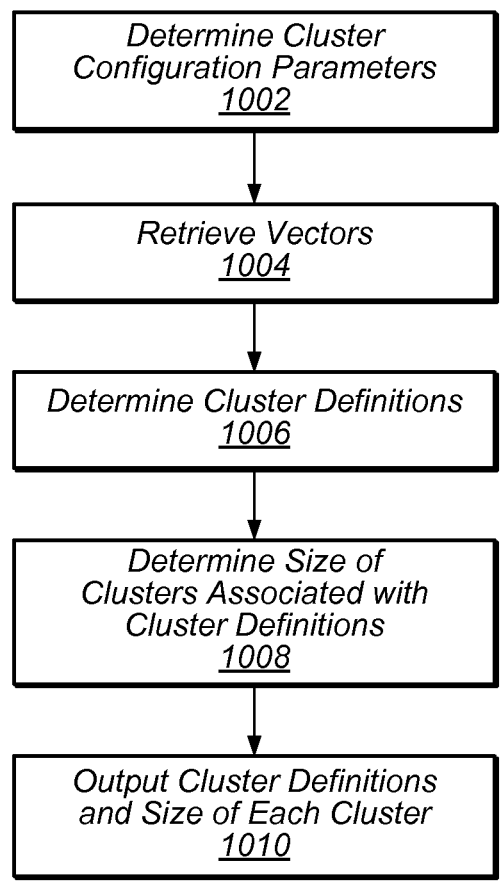
FIG. 10 is a flowchart illustrating a method of determining cluster definitions in accordance with some embodiments.

FIG. 10 is a flowchart illustrating a method of determining cluster definitions in accordance with some embodiments. The method of FIG. 10 may be carried out by clustering module 594. Cluster configuration parameters are determined (block 1002). For example, cluster configuration module 920 accepts user input. Exemplary user input includes selection of a particular clustering algorithm, clustering algorithm input such as the number of desired clusters, or the cluster definitions through the user interface from a user.

The vectors are retrieved (block 1004). For example, cluster analyzer module 910 accepts the vectors 750 from vectorization module 592 or data store 130. Cluster definitions are determined (block 1006). For example, cluster analyzer module 910 accepts the vectors 650 from data store 130 and algorithm selection from cluster configuration module 920 and determines the cluster definitions 930 by analyzing the vectors with a clustering algorithm. In some embodiments, output from cluster configuration module 920 may include the selected cluster algorithm along with any associated parameters such as the number of desired clusters. In an exemplary automated mode, cluster analyzer module 910 will apply the clustering algorithm, along with any associated parameters, to the vectors to determine cluster definitions. In a manual mode, cluster analyzer module 910 will pass along the cluster definitions that were received via cluster configuration module 920 as cluster definitions 930.

The size of the clusters associated with the cluster definitions may be determined (block 1008). For example, cluster analyzer module 910 may determine how many vectors are associated with each of the cluster definitions 930. In some embodiments, the size of each cluster is determined at the same time that the cluster definitions are determined, while in other embodiments, a second pass through the vectors must be made to count the vectors included in the clusters defined by the cluster definitions. Although not necessary in all embodiments, once the cluster definitions have been determined, another pass may be made through the vectors to assign each vector to a cluster defined by the cluster definition. In various embodiments, assignment of the vectors to clusters may facilitate the modifications discussed below in regard to predictive load processor 597, illustrated in FIG. 13.

The cluster definitions 930 are output. In some embodiments, the size of the clusters may be output. In some embodiments, cluster analyzer module 910 outputs the cluster definitions 930 and/or the size of each cluster. In some embodiments, the cluster definitions and/or the size of the clusters may be saved to a data store, such as data store 130, for example. In some embodiments, the cluster definitions may be sent directly to the predictive load processor 597, illustrated in FIG. 13 and described below.

FIG. 11 illustrates the results of a clustering algorithm in accordance with some embodiments. Connectivity models such as hierarchical clustering, centroid models like the k-means algorithm, or distribution models such as multivariate normal distributions used by the expectation-maximization algorithm may be used, although other models are contemplated (e.g., industry standard clustering models or custom made models) and may also be suitable for determining clusters in the production data of various type of production systems. FIG. 11 illustrates the results of applying the k-means algorithm, in particular, to the data. The k-means algorithm takes as input the number of clusters to generate, k, (3, in the illustration) and a set of observation vectors to cluster (illustrated as the individual dots). The k-means algorithm returns a set of centroids. Here, the algorithm has identified centroids A, B, and C, one for each of 3 clusters. The three intersecting lines divide the clusters into their respective groups and are added only for illustrative purposes. Here, an observation vector (an observed data point that has been vectorized as described herein) is classified with the cluster letter or centroid index of the centroid closest to it. Note that although FIG. 11 illustrates that the observation vectors appear in groups, indicated both by the intersecting lines as well as the varying shades of grey, various embodiments stop the clustering analysis once the cluster definitions have been determined and may not actually rearrange the observed vectors into actual clusters. Instead, the cluster definitions are output and subsequently used to process the (pre-vectorization) production request data into a predictive data load, as illustrated in FIGS. 13-14 and described below.

FIG. 12 illustrates a line graph of exemplary clusters of production request data according to an embodiment. In FIG. 12, the information extracted from a clustering pass of the cluster definitions through the production request data is represented graphically as stacked lines. The graph illustrates how much production request data (e.g., production request data) was received per minute throughout the day for each of the clusters associated with a cluster definition. For example, the cluster defined as Cluster 1 had about 1000 transactions per minute at about 1:00, increased gradually to 10,000 transaction per minute until about 16:00 and then decreased to about 500 transactions per minute by 24:00. FIG. 12 illustrates that selection of various segments can produce varying sizes of production request data. For example, selecting the clusters defined as Cluster 3 and Cluster 4 at 10:00 yields about 63,000 and 45,000 transactions per minute, respectively. However, selecting the same cluster definitions at 4:00 yields about 30,000 and 20,000 transactions per minute, respectively. The results of the clustering analysis may be displayed to a user, such as in the form of a graph as illustrated for FIG. 12 via a user interface of the test system 120. In various embodiments, having access to such cluster definitions and the sizes of the clusters defined by the cluster definitions facilitates building a predictive data load because the sizes of the segments of the data cluster is known ahead of time.

FIG. 13 is a data flow diagram of a predictive load processor according to an embodiment. The predictive load processor 597 supports modeling theoretical situations and creating predictive data loads from real production request data. For example, if recent production request data from the production system represents 90% reads and 10% puts, the predictive load processor 597 can build a predictive data load with 65% reads and 35% puts from that production data. Predictive load processor 597 (illustrated in FIG. 5) receives production request data 370, user input 1330 and cluster definitions 930 as input and produces a predictive data load 1310. For example, predictive load processor 597 may receive production data 370 from data store 130, cluster definitions from clustering module 594 and user input 1330 from a predictive load graphical user interface, operator, other user, or otherwise.

For example, a predictive load graphical user interface graphically displays, for one or more intervals, the cluster definitions and respective sizes. In some embodiments, the user interface may accept input from a user indicating adjustments to be made to the cluster definitions, sizes or ratios between the clusters. For example by dragging a line on a graph to change the size of a cluster or moving sections of a pie that graphically display the cluster ratios. The user input may be provided to predictive load specification module 586 as illustrated in FIG. 13. For example, as specification of desired modifications.

Predictive load processor 597 includes predictive load specification module 586 for specifying predictive loads and load creator module 587 from creating predictive loads from the production request data according to the specification. In various embodiments, predictive load specification module 586 receives user input 1330 and cluster definitions 930 (e.g., from clustering module 594) and produces a predictive load specification 1340 that is output to load creator module 587. For example, predictive load specification module 586 may receive a specification expressing a desired predictive load and determine the changes necessary to produce the desired predictive load before carrying out the modifications during processing. In another example, load creator module 587 may receive a predictive load specification from predictive load specification module 586 that has already determined the necessary changes and apply the predictive load specification 1340 directly to production data 370 to produce a predictive data load 1310 without determining any changes itself. The predictive data load may take the form of individual files per time period. In some embodiments, the number of files per time period is configurable and may be specified in the specification. In some embodiments, predictive data load 1310 may be stored to data store 130; while in other embodiments, predictive data load 1310 may be played directly to network-based production system 100.

Modifications or changes to the production request data may include additions or deletions of production request data. In some embodiments, increasing the amount of production request data for a particular segment uses production request data from an adjacent time period, for example, a next time period or a prior time period. In other embodiments, increasing the amount of production request data for a particular segment uses production request data from the same time period but from a different day. For example, if the time of the transactions is meaningful such as Monday mornings. In some embodiments, additions may be made from particular clusters of a segment or to particular clusters of a segment. Generally, an exemplary method of selecting additional data that retains the qualities of the production data may include determining a pattern in the production request data, where the data being added to is part of the pattern. The method may include identifying where the data being added to falls within the pattern, and selecting data having the same location in the pattern. The additional production request data may be retrieved from the data having the same location in the pattern. A non-exhaustive list of exemplary patterns include hourly, daily, weekly, monthly, seasonal, holiday, business cycles, or recreational patterns.

In various embodiments, predictive load processor 597 may receive production request data 370 in real-time from network-based production system 100. In some embodiments, production service 100 may process the real-time production client requests 360 into production request data 370 in real-time before providing the production request data to predictive load processor 597. In various embodiments, clustering component 590 may vectorize and/or cluster the production request data in real-time before providing the production request data to predictive load processor 597.

FIG. 14 is a flowchart illustrating the processing of production request data into a predictive data load according to an embodiment. The process disclosed in FIG. 14 may be performed by the components of FIG. 13. A predictive load specification for a predictive data load is received (block 1410). For example, user input 1330, specifying a predictive data load may be received at predictive load specification module 586 along with cluster definitions 930 from clustering module 594 as illustrated in FIG. 13. Base production request data for an interval is received (block 1420). For example production request data 370 may be received at load creator module 587 from data store 130. The production data may be processed into a predictive data load for each cluster based upon a predictive data load specification (block 1430). For example, production data 370 from data store 130 may be processed into a predictive data load 1310 for each cluster based upon predictive data load specification 1340 from predictive load specification module 586. Load creator module 587, illustrated in FIG. 13, may process the production request data 370 in accordance with the modifications specified in predictive load specification 1340.

For clusters to be decreased in size, some of the production request data is removed from the cluster (block 1432). For example, the predictive load specification 1340 may specify that production request data be removed from a cluster of the production request data 370, received from data store 130. In some embodiments, production request data 370 may be removed from the end of the time period for a cluster. Removing data from the end of the time period may help to retain the realistic nature of relationships among the production data. For example, a customer often makes several read requests before making a purchase request. It may make more sense to delete the customer's requests in the reverse order of how the requests happened in order to avoid the case where a purchase request happens without any read requests. It is more realistic that read requests happen in the absence of a related purchase request than that a purchase request happens in the absence of related read requests. For a cluster to be increased, additional production request data is retrieved from other intervals (block 1434). For example, the predictive load specification 1340 may specify that production request data be retrieved from other intervals of the production request data 370, received from data store 130. In some embodiments, the additional production request data is retrieved from a particular cluster of an interval in order to adjust the ratio among the types of data in the predictive data load. The retrieved production request data may be added to the base production request data for an interval. In some embodiments, production request data 370 may be gathered from the beginning of one of the intervals (or from the beginning of one of the clusters of the interval) and added to the interval receiving the additional production request data in order to retain the natural (or sequential) characteristics of the captured production request data 370. The predictive data load is saved to the datastore (block 1440). For example, predictive data load processor 597 processes the production data in accordance with the predictive load specification 1340 and outputs predictive data load 1310.

FIG. 15 is a flowchart of a method for implementing a test plan, according to one embodiment. In general, as discussed above, a test plan is created, e.g., by one or more controllers 560, depicted in FIG. 5 based on the production data available in data store 130. The test plan may be created automatically based on the production request data available or engineered to create a test plan with a particular test profile (e.g., constant load, increasing load, etc.) for the production service under test (e.g., network-based production service 100 in FIG. 5). The test plan is executed by controllers 560 creating and placing test jobs in a job queue (e.g., queue 550 in FIG. 5) at the rate specified by the test plan.

As indicated in 1500, a test plan for test is created. In some embodiments, the test plan is created by a test plan builder (e.g., test plan builder 570 in FIG. 5) in a controller (e.g., controller 560 in FIG. 5) querying the available production request data (e.g., predictive data load data in data store 130 in FIG. 5). In some embodiments, the test plan indicates that the predictive data load data is to be replayed in the same order and time intervals as it was processed into. In some embodiments, the test plan indicates that the production data of the predictive data load is to be re-ordered or grouped to create a particular test profile. For example, a test profile may be created by re-ordering the predictive data load data to provide constant loading or decreasing loading of the production data replayed to simulate a load in a production service (e.g., network-based production service 100 in FIG. 5). As another example, the test plan may combine production request data from a similar time frame from multiple days to simulate peak traffic in the production service. In some embodiments, the test plan may include instructions corresponding to the data. For example, the time stamps saved with the production request data of the predictive load may need to be altered to reflect the current time. In some embodiments, the test plan may filter the predictive data load data by the metadata stored with the predictive data load data. For example, a test plan for a retail website that has websites for multiple countries may be created by filtering the data by the website address. For example, if the test plan indicated that only the production service hosting the German version of the retail website will be tested, the predictive data load data may be filtered to include only production data originally sent to the German site, e.g., with ".de" at the end of the website address.

As indicated in 1510, execution of the test plan begins. In some embodiments, a test plan executor 580 in controller 560 as depicted in FIG. 5 executes the test plan. If a single controller (e.g., controller 560 in FIG. 5) is not able to handle placement of the jobs in the job queue (e.g., queue 550 in FIG. 5) at the rate indicated by the test plan, one or more controllers (e.g., controllers 560 in FIG. 5) are added. For example, if the test plan created a test profile combining three days worth of data into a single day to create a more stressful test profile, three controllers may be implemented to create test jobs for each day's worth of data in parallel.

As indicated in 1520, the jobs are placed in the queue according to the test plan. In some embodiments, the jobs (e.g., jobs 540 in FIG. 5) are created by a controller (e.g., controller 560 in FIG. 5) as indicated by the test plan. The jobs are placed in the queue (e.g., controller 560 placing jobs 540 in queue 550 as depicted in FIG. 5) at a specified rate. The rate that the jobs are applied to the queue, ensures that the specified test or load profile (e.g., constant, increasing, etc.) is created by the workers posting the jobs to the production service, for example. In some embodiments, the jobs (e.g., jobs 540 in FIG. 5) comprise links or pointers to the production data (e.g., production data in data store 130). In some embodiments, instructions associated with the job are included in the job. For example, the instructions may indicate that the date and time corresponding to the production data must be changed by the workers (e.g., workers 530 in FIG. 5) prior to posting the job to the production service. In some embodiments, the jobs placed in the job queue are place by one or more controllers.

FIGS. 16A-D are charts depicting a set of test profiles, according to one embodiment. In general, as discussed above, the test plan determines the test or load profile. Each test profile may stress or test certain aspects of the production service under test (e.g., network-based production service 100 in FIG. 1). For example, an increasing or decreasing load may test the production services capability to scale in response to the load.

Figure 16B:
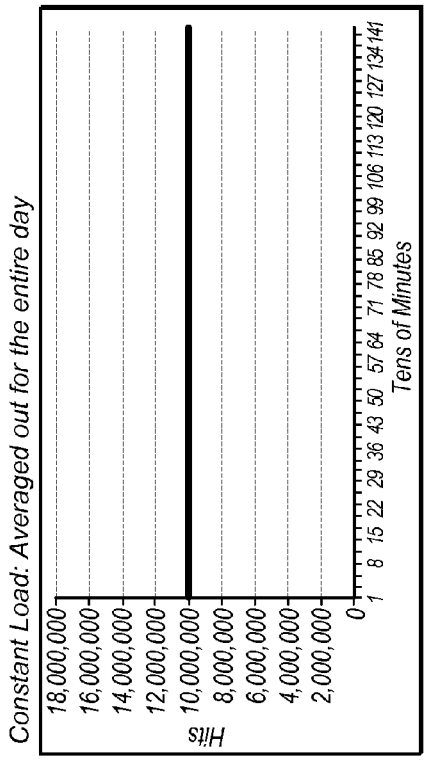
FIGS. 16A-D are charts depicting a set of test profiles, according to one embodiment.
Figure 16D:
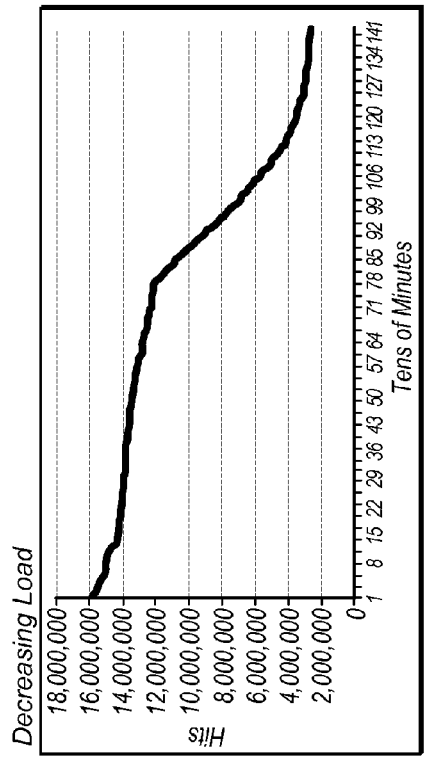
Figure 16A:
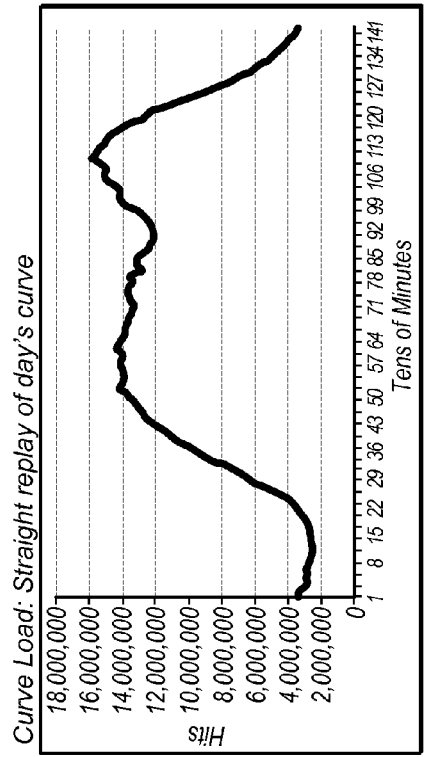

FIG. 16A depicts a straight replay of a single day's data for a retail website. As described in the above figures, client requests are captured on an ongoing basis and stored according to predetermined standard time frames and intervals. In this example, each time interval has millions of client requests (e.g., website hits). The number of client requests peaks at 16 million requests. To simulate this load, the test plan builder in controller 560 as depicted in FIG. 5 creates a test plan by querying the production data (e.g., production data from the predictive data load in data store 130 in FIG. 5) corresponding to the day depicted in the Figure. When the test plan to complete a straight replay is executed, test jobs are created and submitted (e.g., by controller 560 in FIG. 5) at a rate corresponding to the original rate to simulate the same load on the production service under test.

FIG. 16B depicts a constant load to be applied for a given time frame. In this example, a constant load is maintained at ten million hits throughout the entire time frame (e.g., day). As described in the above Figure, client requests are captured on an ongoing basis and stored at a predetermined standard interval. To create the constant load, the test plan builder (e.g., test plan builder 570 in FIG. 5) queries the production request data (e.g., production request data of the predictive data load in data store 130 in FIG. 5). Based on the information received, the test plan builder may re-arrange the production request data stored in the predictive data load data to create a test profile simulating a constant load. When the test plan is executed, the test jobs with the re-arranged data are submitted at the appropriate rate as indicated by the test plan to ensure a constant load in the production service under test. A constant load test may be created to ensure that the production service under test can maintain a constant level of service over a given time frame, for example. To simulate any type of load, the controllers and workers may scale independently in response to the changing demands of the test profile. In addition, the auto-shutdown capabilities described above may determine that the test must be shut down to preserve production system operation for the clients, for example.

Figure 16C:
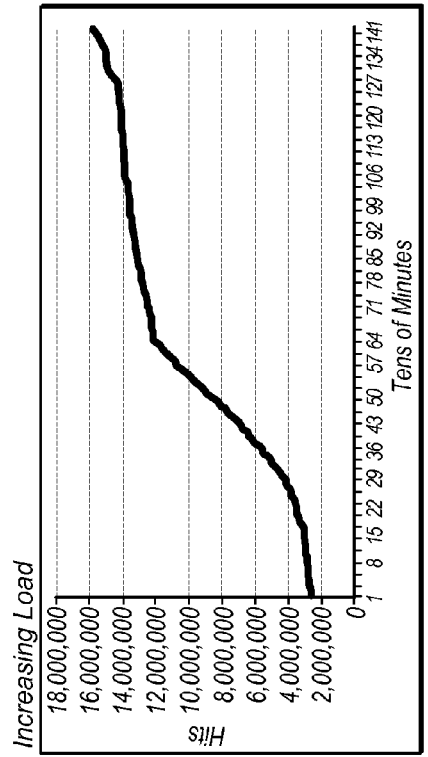

FIG. 16C depicts an increasing load to be applied for a given time period. As described in the above figures, client requests are captured on an ongoing basis and stored at predetermined standard time intervals. In this example, each time interval has millions of client requests (e.g., website hits). The number of client requests starts slightly above two million hits and peaks at 16 million hits or client request. To create the increasing load, the test plan builder (e.g., test plan builder 570 in FIG. 5) queries the production data (e.g., production requests from the predictive data load data in data store 130 in FIG. 5) to determine the available data. In some embodiments, the production request data in the predictive data load data is re-arranged to create a test profile simulating an increasing load. In other embodiments, the production data from one time period is combined with production data from another time period with similar time frames to create the increasing load. An increasing load may be used to test that the components of the production service under test work appropriately in response the increasing load. An increasing load test may also indicate where the breaking point is of the production service under test. For example, at a given point in the test, the metrics of the production service may indicate that the traffic on the production service is maximizing the capabilities of the components (e.g., CPU and/or memory usage) of the production service. For this type of load, the controllers and workers may scale independently in response to the changing demands of the test profile. In addition, the auto-shutdown capabilities described above may determine that the test must be shut down to preserve production system operation for the clients, for example.

FIG. 16D depicts a decreasing load to be applied for a given time period. As described in the above figures, client requests are captured on an ongoing basis and stored at a predetermined standard time interval. In this example, each time interval has millions of client requests (e.g., website hits). The number of client requests begins at 16 million requests and decreases at slightly above two million requests. As discussed above, to create the decreasing load, the test plan builder (e.g., test plan builder 570 in FIG. 5) queries the production data (e.g., production request data from the predictive data load in data store 130 in FIG. 5) to determine the available data. In some embodiments, the client requests stored in the available production data is re-arranged to create a decreasing load. In other embodiments, the available production request data from one time period is combined with production data with similar timeframes from another time period to create the decreasing load. A decreasing load may be used to test that the components of the production service under test scale down appropriately in response the decreasing load. A decreasing load test may also determine how the production service under test responds to an unexpected decrease in client requests (e.g., from the initial peak of data). For this type of test profile, as described above the controllers and workers may scale independently in response to the changing demands of the test profile. For this type of load, the controllers and workers may scale independently in response to the changing demands of the test profile. In addition, the auto-shutdown capabilities described above may determine that the test must be shut down to preserve production system operation for the clients, for example.

In some embodiments, adjustment of the rate may be performed by the predictive load processor 597 while processing the production request data 370 into a predictive load 1310, illustrated in FIG. 13. For example, additional production request data may be added to intervals in order to increase the number of requests played per interval as described above in the description of FIG. 14.

Figure 17:
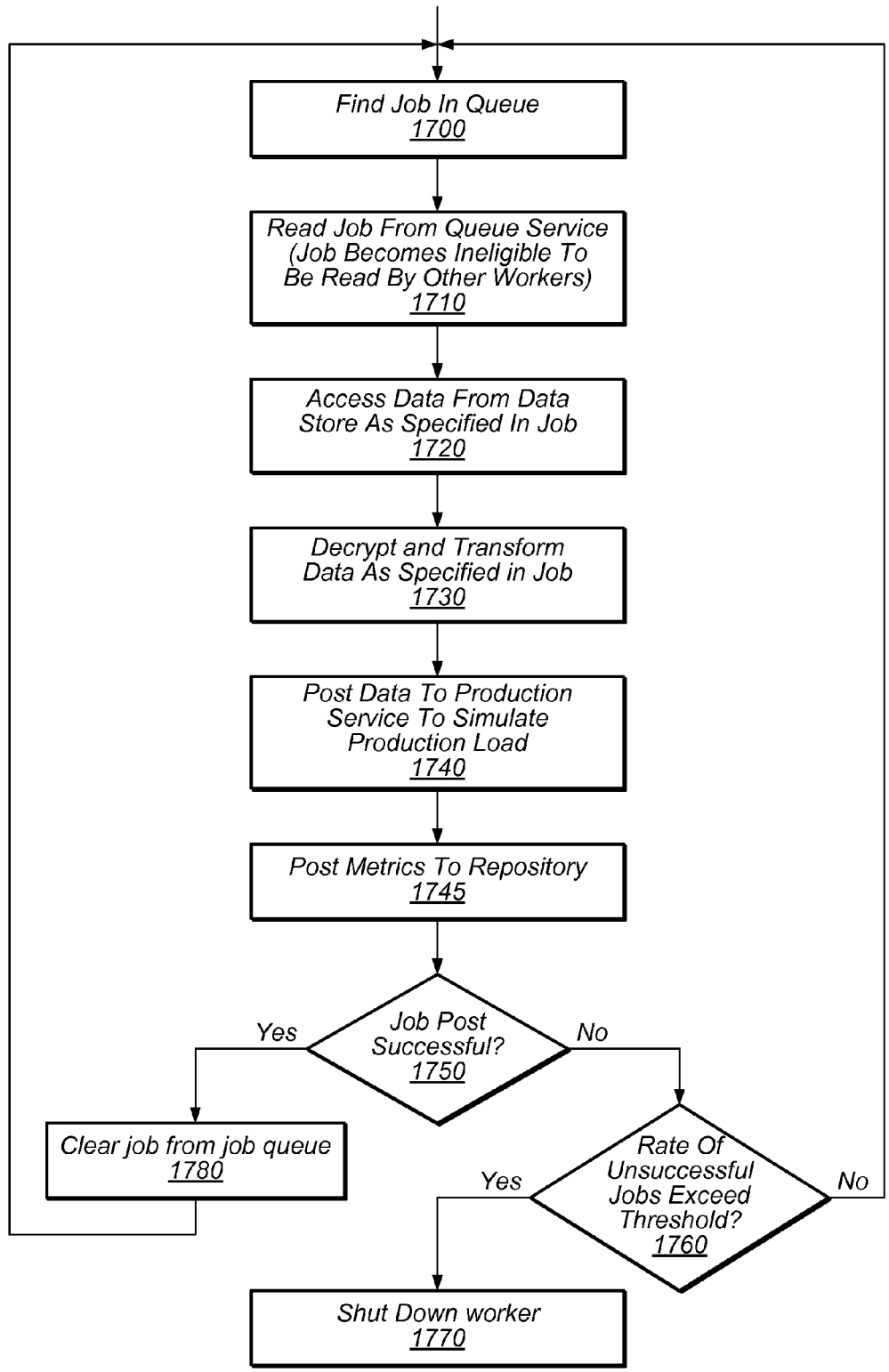
FIG. 17 is a flowchart of a method for workers executing test jobs, according to one embodiment.

FIG. 17 is a flowchart of a method for workers executing jobs, according to one embodiment. In general, workers (e.g., workers 530 in FIG. 5) access jobs from a job queue (e.g., jobs 540 in queue 550) and replay the data from the job to the production service under test (e.g., network-based production service 100 in FIG. 5). In addition, each of the jobs (e.g., jobs 540 in FIG. 5) may have corresponding instructions that workers (e.g., workers 530) execute prior to replaying the production data to network-based production service 100.

As indicated in 1700, a worker accesses a job queue (e.g., job queue 550 in FIG. 5) to find a job. For example, jobs may be ordered by age in the job queue. When a worker access the job queue for a job, the oldest available (e.g., untaken) job may be indicated to the worker.

As indicated in 1710, in some embodiments, the job is read from the queue (e.g., queue 550), e.g., by a worker. As discussed above, reading the job from the queue marks the job as "taken". A job marked as "taken" is ineligible to be read by other workers, but the job remains in the queue, in some embodiments. If the job fails to complete, in some embodiments, the job may be remarked as "untaken" so that the job is again available for a worker to access.

As indicated in 1720, the production request data (e.g., production request data in data store 130 in FIG. 5) specified in the job (e.g., job 540 in FIG. 5) is accessed from the data store (e.g., data store 130 in FIG. 5), e.g., by a worker that has taken the job. The data is decrypted and transformed as specified in the job, as indicated in 1730, in some embodiments. As described above, a transformation may be a change in the original date and time corresponding to the decrypted data, for example.

As indicated in 1740, the decrypted and transformed data (e.g., production request data from data store 130 in FIG. 5) is posted to the production service to simulate a production load. Once the job (e.g., job 540) is posted to the production service (e.g., network-based production service 100), as indicated in 1750, the job success is determined, in some embodiments. For example, once the job completes, notification may be sent by the worker (e.g., worker 530 in FIG. 5) to the queue (e.g., queue 550 in FIG. 5) indicating that the job (e.g., job 540) can be deleted from the queue, as indicated in 1780. The worker that processed the completed job can access the next untaken job in the job queue (e.g., return to 1700).

As indicated in 1745, metrics corresponding to the data posted to the production service are posted to a metrics repository. Examples of the metrics posted are success and/or fail of the request/data posted to the production service, latency for posting data to the production service, latency of the response to the posted data, and/or the amount of data sent when posting data to the production service at 1740. The metrics data for all workers is aggregated, in some embodiments, to assess the health of the production service and/or load generator (e.g., load generator 500 in FIG. 5). This information may be used for an auto shutdown process of the test as described below.

As indicated in 1760, if the job post was not successful, the rate of unsuccessful jobs is checked to determine if the rate exceeds a threshold. A job (e.g., job 540) may be unsuccessful if it does not complete within a given time period, for example. A job may fail because a worker stopped processing, due to a systemic issue in the production service under test and/or due to a network issue, for example. The threshold may be put in place, for example, to ensure that the workers (e.g., workers 530 in FIG. 5) accessing jobs from the job queue (e.g., queue 550 in FIG. 5) and posting them to the production service (e.g., network-based production service 100 in FIG. 5) are processing the jobs at a rate as specified by the test plan. In some embodiments, the success rate of a given work is compared to a threshold. If the threshold has been exceeded, in some embodiments, the worker is shut down as indicated in 1770. The worker may be shut down by auto-shutdown module 520 as depicted in FIG. 5. If the threshold has not been exceeded, then the worker may access the next available job (e.g., return to 1700), in some embodiments.

As discussed above, when a job fails, if the threshold for the rate of unsuccessful jobs has not been exceeded, the worker returns to the queue to find the next job (e.g., step 1700). In addition, if the job completed successfully, the worker returns to the queue to find the next job (e.g., step 1700). A given worker may, in some embodiments, begin a new job while waiting for acknowledgment from the production service that the request(s) for a job have been received or completed. The worker may discard any results from the production service for the replayed request(s) for a job. Multiple jobs may be processed by multiple workers in parallel.

Figure 18:
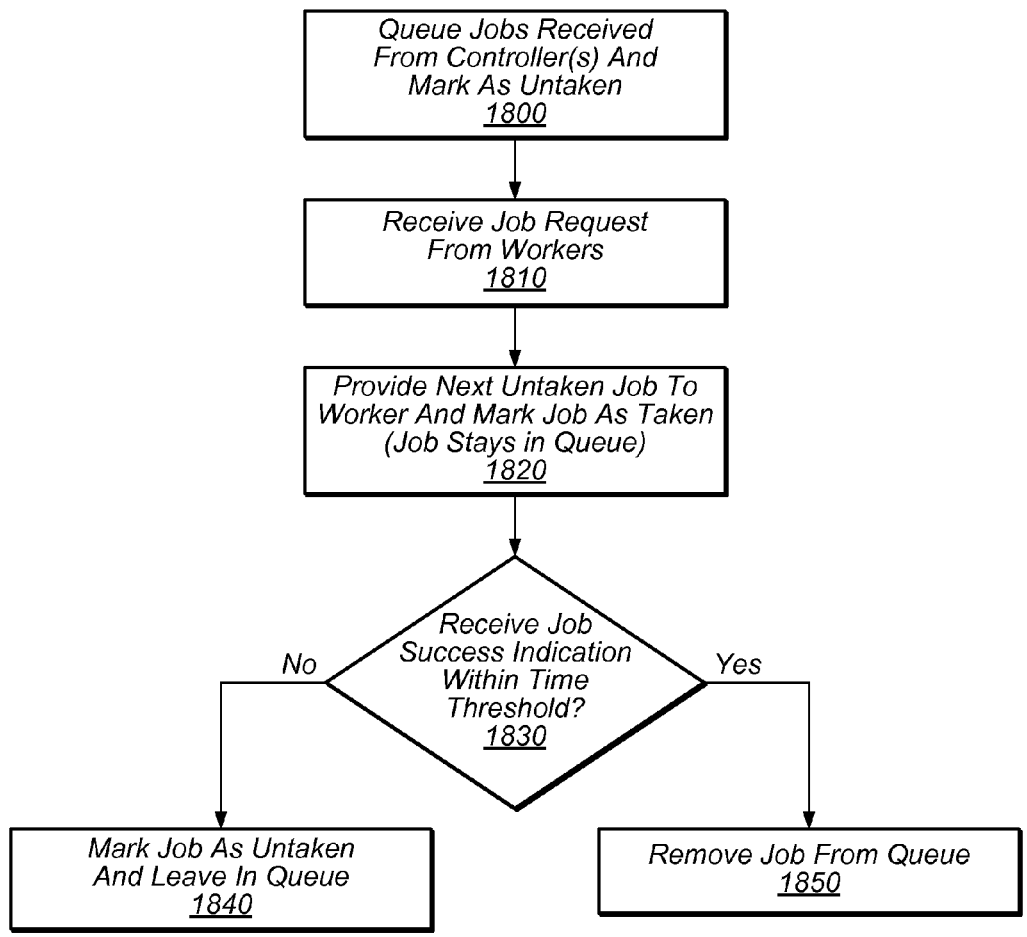
FIG. 18 is a flowchart of a method for job queue management of test jobs, according to one embodiment.

FIG. 18 is a flowchart of a method for job queue management of test jobs, according to one embodiment. In general, a job queue is implemented to facilitate efficient work flows in a test system (e.g., scalable production test system 120 in FIG. 5), in some embodiments. Job queue (e.g., queue 550 in FIG. 5) may be implemented either internal or external to the test system, for example. The test system may typically process many tasks in parallel and the job queue ensures that the next task is available as each task completes, for example. In addition, in the scalable production test system 120 depicted in FIG. 5, the job queue 550 decouples the controllers 560 submitting jobs to the queue from the workers 530 accessing jobs from the queue. This allows the controllers and workers to scale separately and independently from each other. To manage, the queue, the jobs may be marked to indicate their status, in some embodiments.

As indicated in 1800, jobs are received from one or more controllers and marked as untaken. Marking the jobs as untaken indicates that the jobs are available for access by a worker (e.g., by workers 530 in FIG. 5). As discussed above, a job (e.g., job 540 in FIG. 5) comprises a link or a pointer to production data for replay and instructions for the data, in some embodiments.

As indicated in 1810, a request for a job is received from a worker (e.g., workers 530 in FIG. 5).

As indicated in 1820, the next untaken job is provided to the worker and the job is marked as taken. However, the job remains in the queue until notification of completion is received. Marking the job as taken ensures that another worker does not access the job while it is progress, in some embodiments.

As indicated in 1830, in some embodiments, jobs are expected to complete within a time threshold. In some embodiments, if the job (e.g., job 540 in FIG. 5) does not complete within a particular time threshold, the job is marked as untaken in the queue (e.g., queue 550 in FIG. 5). Marking the job as untaken makes it available in the queue again for another worker (e.g., worker 530 in FIG. 5) to request, as indicated in 1840. In some embodiments, if the indication of job success was received prior to the time threshold, the job is removed from the queue (e.g., queue 550 in FIG. 5) as indicated in 1850.

Figure 19:
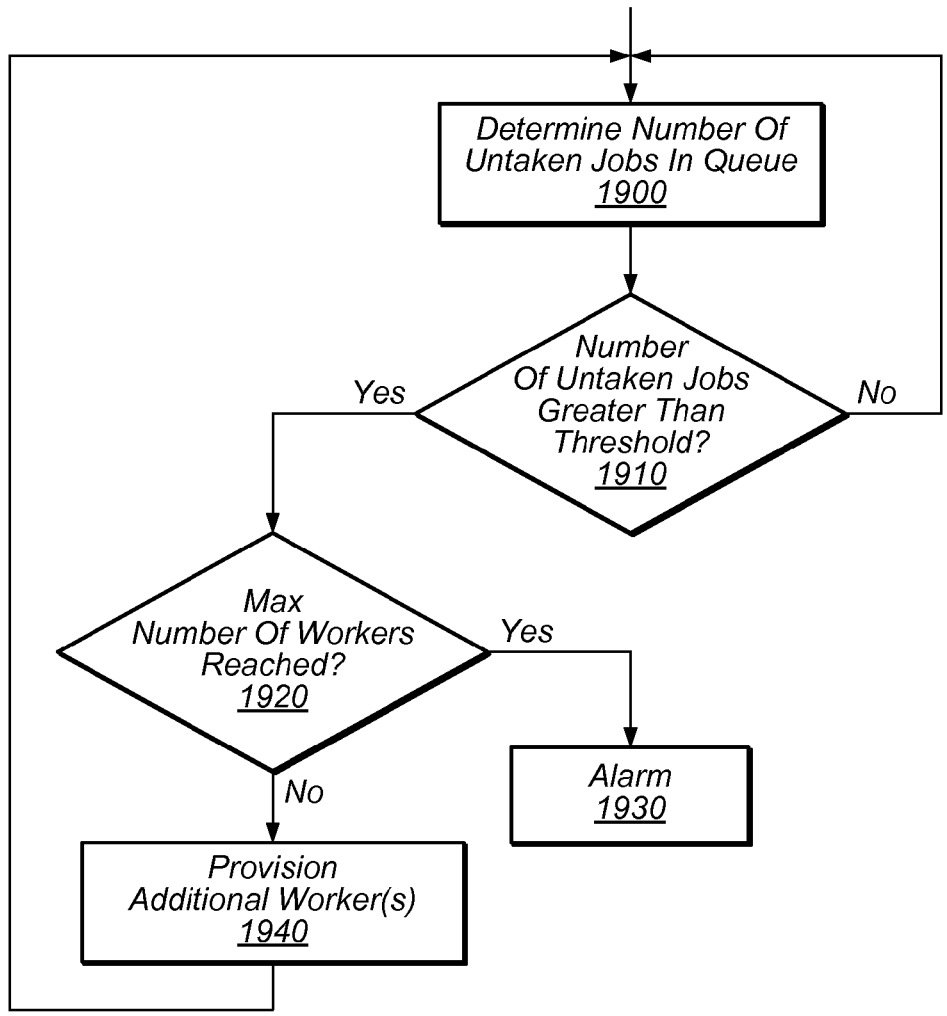
FIG. 19 is a flowchart of a method for auto-scaling workers in response to job metrics, according to one embodiment.

FIG. 19 is a flowchart of a method for auto-scaling workers in response to job queue metrics, according to one embodiment. In general, auto-scaling ensures the test plan is implemented as designed and the appropriate amount of compute resources (e.g., workers) is available for test jobs, tasks or processes. For example, as described above in FIGS. 16A-D, the simulated loads may range from a curved load, to a constant load and/or an increasing/decreasing load. The different loads utilize different amounts of controllers and workers as depicted in FIG. 5 at different times. Scaling may be performed to ensure adequate resources and avoid under-utilized resources (e.g., compute and memory resources for workers 530 and controllers 560 in FIG. 5). In some embodiments, one indicator of auto-scaling success is that the number of the jobs (e.g., jobs 540 in FIG. 5) in the job queue (e.g., queue 550 in FIG. 5) maintains a minimum size approaching zero.

As indicated in 1900, the number of untaken jobs in the queue (e.g., queue 550 in FIG. 5) is determined. As discussed above, untaken jobs are jobs that are available for access by a worker (e.g., by workers 530 in FIG. 5) for posting to the production service under test (e.g., network-based production service 100 in FIG. 5). In some embodiments, the auto-scaler (e.g., auto-scaler 510 in FIG. 5) determines the number of untaken jobs via a job quantity metric, for example. As discussed above, jobs are continually placed in the job queue (e.g., by controllers 560) according to a test plan, in some embodiments. In some embodiments, the auto-scaler is configured to maintain a minimal queue size and ensure that once a job is placed in the queue, it is accessed and processed in a time frame corresponding to maintaining a minimal queue size.

As indicated in 1910, the number of untaken jobs is compared to a threshold by auto-scaler 510 as depicted in FIG. 5. If the number is below the threshold, the auto-scaler returns to 1900 and continues to monitor the number of untaken jobs in the job queue.

As indicated in 1920, if the number of untaken jobs (e.g., jobs 540 in FIG. 5) is greater than a threshold, the auto-scaler determines if more workers can be added. In some embodiments, predetermining a maximum number of workers ensures the health of the production system under test. If the maximum number of workers has been reached and scaling the number of workers up would exceed the maximum number of workers, then as indicated in 1930, an alarm occurs. The alarm may be utilized to ensure that the number of workers does not grow unchecked, such that the test processes may inhibit real client requests and affect the client experience in the production system. In some embodiments, the alarm may serve as an alert. In alternate embodiments, the alarm may initiate auto-shutdown (e.g., by auto-shutdown module 520 in FIG. 5) of the scalable test production system depicted in FIG. 5.

As indicated in 1940, if the maximum number of workers has not been reached, one or more additional worker are provisioned. Provisioning additional workers (e.g., scaling up), may ensure that untaken jobs (e.g., in queue 550 in FIG. 5) continue to be accessed and posted to the production service under test (e.g., production service 100 in FIGS. 1 and 5) in the time frame indicated by the test plan, for example. After provisioning an additional worker(s), the auto-scaler (e.g., auto-scaler 510 in FIG. 5) returns to step 1900 to continue the process.

Figure 20:
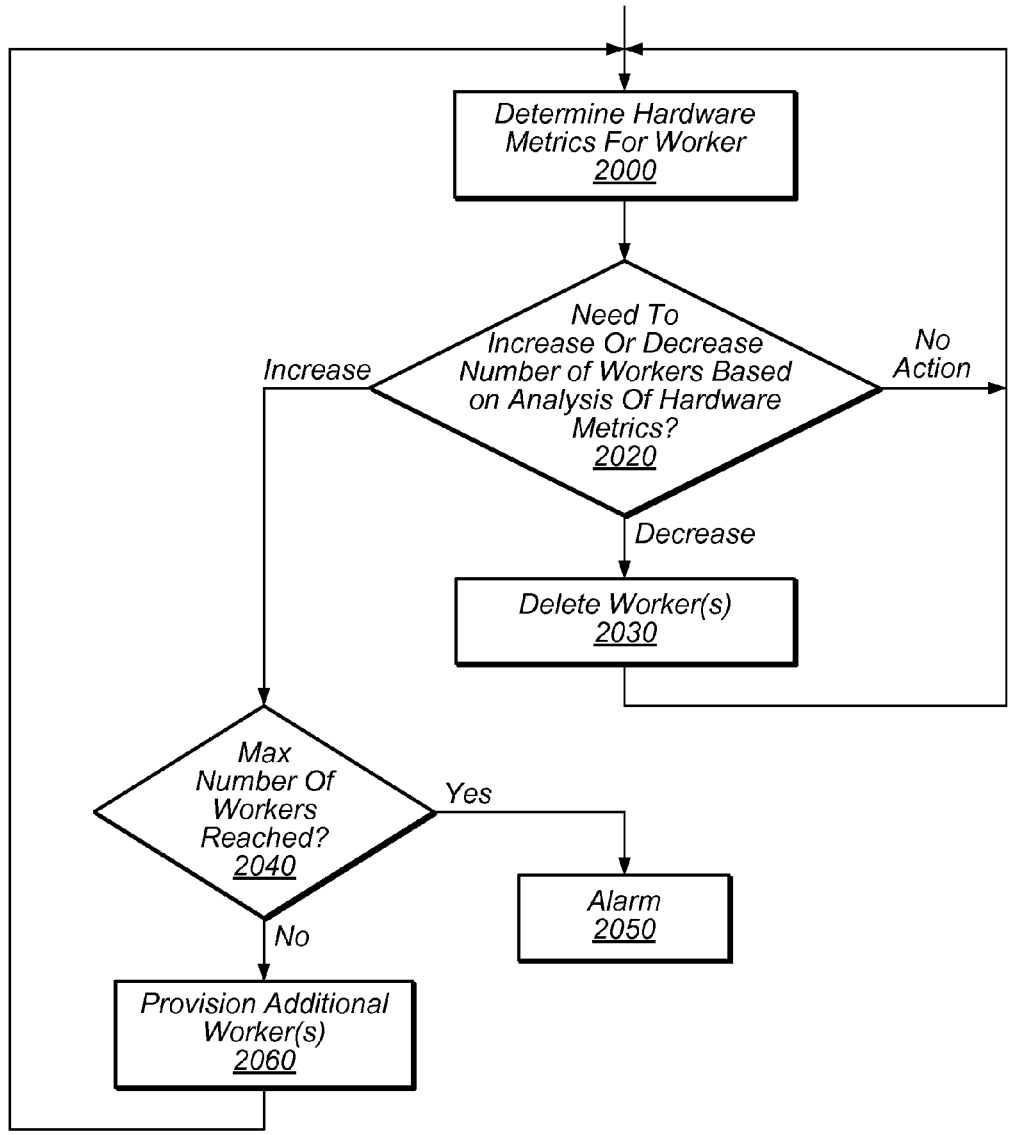
FIG. 20 is a flowchart of a method for auto-scaling the number of workers in response to system metrics, according to one embodiment.

FIG. 20 is a flow chart of a method for auto-scaling the number of workers in response to system metrics, according to one embodiment. In general, as discussed above, auto-scaling is a technique that ensures the test plan is implemented as designed and the appropriate amount of compute resources are available for test jobs, tasks or processes, in some embodiments. As discussed above, the test load on the production test service may be a curved, increasing/decreasing or constant load. Auto-scaling may be implemented to avoid idle computer resources, for example. In addition, if the computer resources are not scaled up to meet demand, the test may not execute as intended. In some embodiments, auto-scaling may monitor key metrics of the scalable test system to determine if auto-scaling is needed. Examples of metrics are memory, CPU, disk or network usage of the resources used to implement workers.

As indicated in 2000, hardware metrics for workers (e.g., workers 530 in FIG. 5) are determined and monitored. Examples of hardware metrics are memory, CPU, disk or network usage. In some embodiments, a predetermined threshold or operational criteria is determined for each metric.

As indicated in 2020, based on the hardware metrics the auto-scaler determines if the number of workers needs to increase. For example, if CPU or memory usage on a system implementing a worker is too high, the worker may not be able to keep up with the test job rate and one or more additional workers should be provisioned. In some embodiments, if the hardware metrics indicated that usage meets particular criteria or has not fallen below a particular threshold, no action may be taken and the auto-scaler returns to 2000 and continues to monitor the hardware metrics.

As indicated in 2030, workers (e.g., workers 530 in FIG. 5) are deleted based on the analysis of hardware metrics in 2020. For example, if the hardware metrics have fallen below a predetermine criteria or threshold, the compute resources (e.g., workers 530 in FIG. 5) may be idle or underutilized. The idle workers are deleted in some embodiments. In some embodiments, a minimum number of workers is established. Once the minimum is reached, no more workers are deleted even if they are idle or underutilized.

As indicated in 2040, based on the analysis of the hardware metrics in 2020, the number of workers needs to increase, and the number of workers (e.g., workers 530 in FIG. 5) is evaluated to determine if a maximum number has been reached. As discussed above, in some embodiments, a maximum number of workers is determined to ensure the health of the production service (e.g., network-based production service 100 in FIG. 5). As discussed above, if the number of workers is allowed to grow unchecked, the workers may interfere with real client requests in the production system 100.

In some embodiments, if the maximum number of workers (e.g., workers 530 in FIG. 5) has been reached, an alarm occurs, as indicated in 2050. As discussed above, the alarm serves as an alert or initiates auto-shutdown (e.g., auto shutdown module 520) of the scalable test production system 120, in some embodiments. If the maximum number of workers has not been reached, in some embodiments, one or more additional workers are provisioned, as indicated in 2060. Once the additional workers are provisioned, the hardware metrics continue to be monitored in 2000, in some embodiments.

Additionally, in some embodiments, the methods of FIGS. 19 and 20 may be combined. In some embodiments, both the hardware metrics and the queue size in the scalable test system are monitored to determine whether auto-scaling of the workers is needed. Monitoring the hardware metrics may ensure effective use of resources, for example. Monitoring the job queue may ensure that the test plan is implemented as designed, for example.

Figure 21:
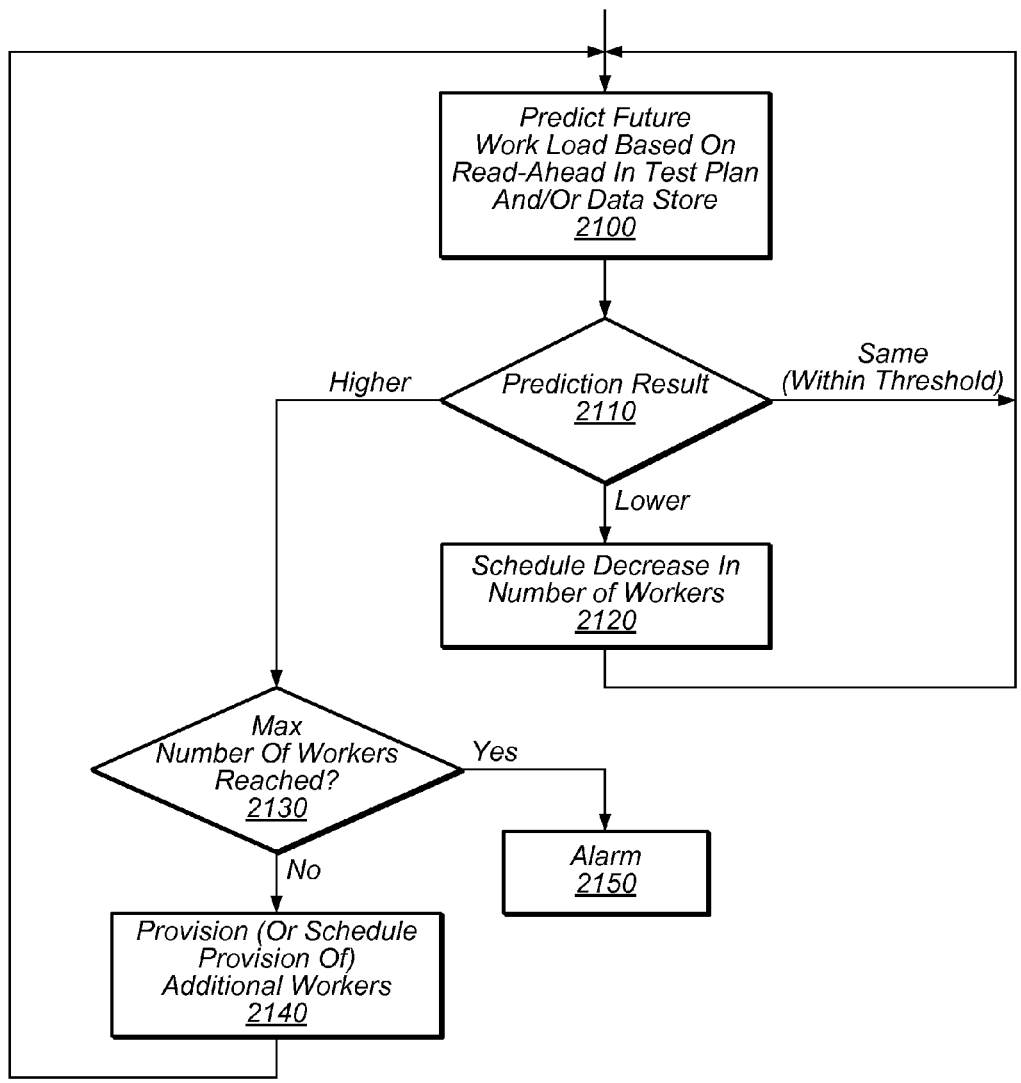
FIG. 21 is a flowchart of a method implementing predictive auto-scaling during execution of a test plan, according to one embodiment.

FIG. 21 is a flowchart of a method implementing predictive auto-scaling of workers, according to one embodiment. In general, auto-scaling workers can be completed in a predictive manner. As described above, a test plan is created (e.g., by test plan builder 570 in FIG. 5) based on the production data (e.g., in production data in data store 130 in FIG. 5). Since the test plan and the production data are deterministic, it is possible to predict increases in the load for the scalable production test system under test, for example. For example, advance knowledge of increasing loads may indicate a need for more workers in the near future. Conversely, advance knowledge of decreasing loads may indicate an opportunity to decrease the number of workers in the near future, for example.

As indicated in 2100, the future work load is predicted based on a read-ahead in the test plan and/or data store. As discussed above, production data (e.g., production request data 370 in FIG. 3) captured from client requests are stored for use in testing the production service (e.g., network-based production service 100 in FIG. 5), in some embodiments. In some embodiments, a test plan is determined, e.g., by controllers (e.g., controller 560 in FIG. 5), based on the production data (e.g., production data in data store 130 in FIG. 5). Given at least one of the known values (e.g., production data and/or test plan), the future work load may be predicted by the auto-scaler 510, in some embodiments.

As indicated in 2110, based on the results of the read-ahead, the number of workers (e.g., workers 530 in FIG. 5) may increase, decrease or stay the same. In some embodiments, if the prediction results indicated the work load is unchanged, there is no need to adjust the number of workers so return to reading ahead in 2100.

As indicated in 2120, based on the prediction result from the read-ahead in the test plan (e.g., determined by controller 560 in FIG. 5) and/or data store (e.g., data store 130 in FIG. 5), a decrease in workers is scheduled. At this point the read-ahead of the test plan and/or data store continues in 2100, in some embodiments.

As indicated in 2130, based on the prediction results from the read-ahead in the test plan and/or data store, an increase in workers is needed. However, in some embodiments, the current number of workers (e.g., workers 530 in FIG. 5) is evaluated to determine if a maximum threshold has been reached. If a maximum threshold has been reached, as indicated in 2150, an alarm occurs in some embodiments. In some embodiments, the alarm initiates auto-shutdown (e.g., by auto shutdown module 520 in FIG. 1) of the scalable test system or provides an alert.

As indicated in 2140, the maximum number of workers has not been reached so additional workers (e.g., workers 530 in FIG. 5) are scheduled or provisioned by auto-scaler 510 depicted in FIG. 5. At this point the read-ahead of the test plan and/or data store continues in 2100, in some embodiments.

Once additional workers have been provisioned, the method returns to step 2100 and continues to read-ahead in the test plan and/or data store. In some embodiments, auto-scaling based on metrics (as discussed in regard to FIGS. 19 and/or 20) and based on read-ahead of the test plan and/or data store (as discussed for FIG. 21) may be combined such that some or all of the techniques may be used together for scaling workers.

Figure 22:
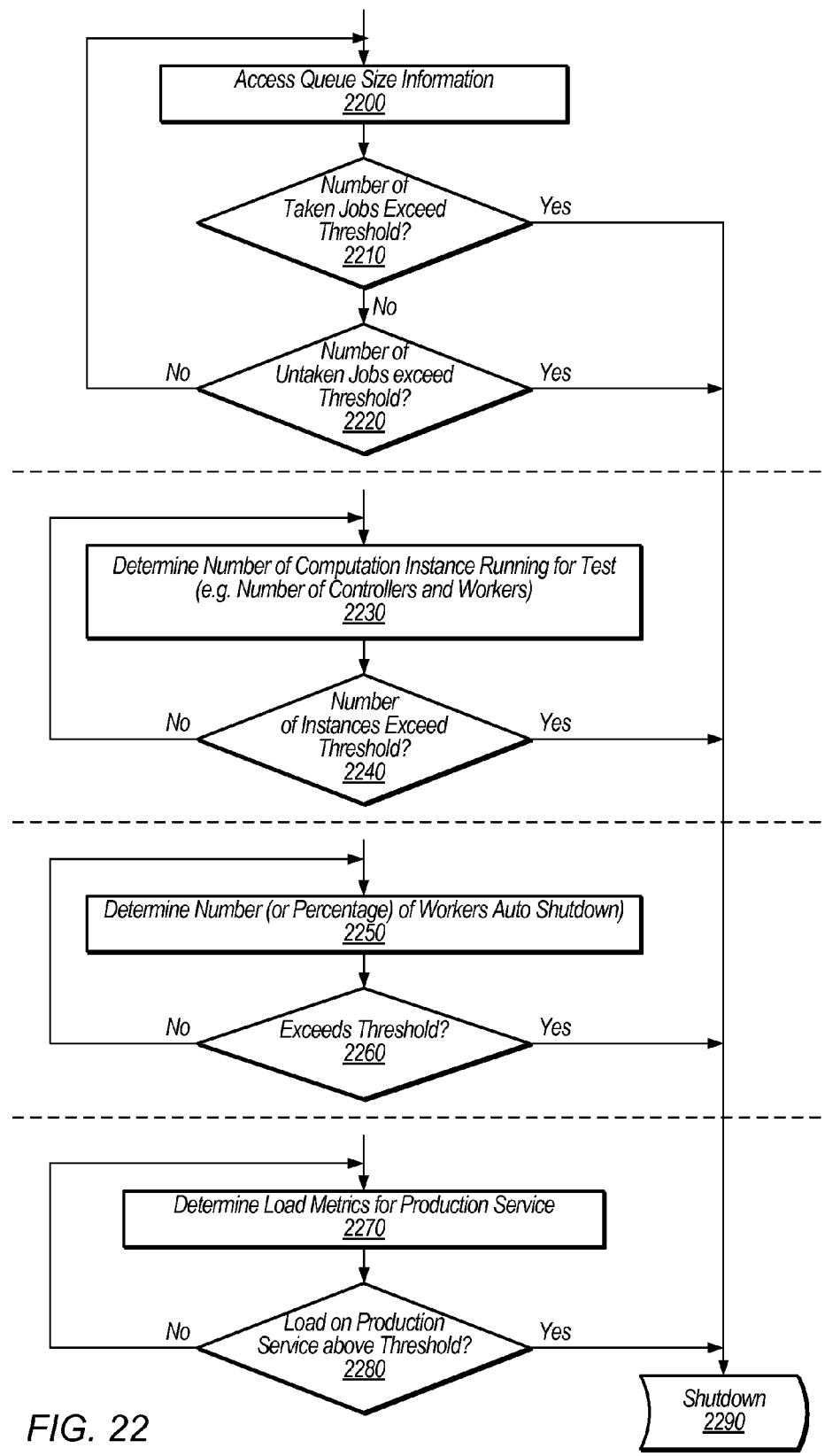
FIG. 22 is a flowchart of a method for auto-shutdown of a scalable production test system, according to one embodiment.

FIG. 22 is a flowchart of a method for auto-shutdown of a scalable test system, according to one embodiment. In general, as discussed above, the scalable production test system as depicted in FIGS. 1 and 5) is implemented to test a production service in real-time and with real data (e.g., captured client request data stored for subsequent use). Given the risks with implementing testing in a production environment, in some embodiments, auto-shutdown is implemented to ensure real client requests are not inhibited and/or the production service itself is not shut down.

As indicated in 2200, in some embodiments, the queue size information is accessed. The size of the queue (e.g., queue 550 in FIG. 5), in some embodiments, indicates if jobs (e.g., jobs 540 in FIG. 5) are executing as defined by the test plan. For example, in a well provisioned test system, the number of jobs in the job queue should be near zero. As indicated in 2210, in some embodiments, if the number of taken jobs exceeds a given threshold, auto-shutdown occurs, as indicated in 2290. If the number of taken jobs exceeds a given threshold, this may indicate that workers are stuck on a job or that many jobs have failed, for example.

As indicated in 2220, in some embodiments, if the number of taken jobs has not exceeded a threshold, the number of untaken jobs is evaluated to determine if a threshold has been exceeded. If the threshold has been exceeded, auto-shutdown (e.g., by auto-shutdown module 520 in FIG. 5) occurs as indicated in 2290. If the number of untaken jobs has exceeded a given threshold, this may indicate that the workers (e.g., workers 530 in FIG. 5) are not able to handle the current load. If neither threshold has been exceeded, the queue size continues to be monitored, in some embodiments.

In some embodiments, the number of computation instances running to carry out the test plan is monitored. In some embodiments, monitoring the number of computation instances running to carry out the test plan is performed in parallel with monitoring the queue size as discussed above. As indicated in 2230, in some embodiments, the number of controllers and workers (e.g., controllers 560 and workers 530) are determined. As discussed above, in some embodiments, the controllers place jobs in the job queue at the rate determined by the test plan. As discussed above, in some embodiments, the workers access jobs from the job queue and post them to the production service under test (e.g., production service 100 in FIG. 5). If the number of controllers and/or workers exceeds a threshold, as indicated in 2240, auto-shutdown 2290 occurs, in some embodiments. If neither has exceeded a threshold, the number of controllers and/or workers (e.g., controllers 560 and workers 530 in FIG. 5) continues to be monitored, in some embodiments.

As indicated in 2250, in some embodiments, the number of workers that are shutting themselves down or being shut down is monitored. Monitoring the number of workers shut down may be performed in addition to monitoring the queue size and/or number of computation instances as described above. In some embodiments, as indicated in 2260, if the number of workers that are shutting themselves down exceeds a threshold, auto-shutdown 2290 occurs. If the threshold has not been exceeded, in some embodiments, then the number of workers (e.g., workers 530 in FIG. 5) that have been shut down continues to be monitored.

In some embodiments, as indicated in 2270, load metrics for the production service are monitored. Monitoring the health of the production service as indicated at 2270 may be performed in parallel to monitoring the queue size, computation instances, and/or number of workers auto-shutdown. Examples of load metrics are memory, CPU, disk and/or network usage of the production service under test (e.g., production service 100 in FIG. 1). For example, if the CPU using exceeds 90% on at least half of the compute resources in use for more than 30 minute, auto-shutdown may occur. In some embodiments, if any one of the load metrics indicates that the load on the production service is above a threshold, as indicated in 2280, shutdown 2290 occurs. If the load metrics are below a threshold, the load metrics continue to be monitored.

As discussed above, the queue size, number of computational instances, number of workers and/or load metrics are monitored in parallel in some embodiments. Any one of these or a combination of these may indicate a need to shut down the scalable production test system, in some embodiments. Shutting down the scalable production test system may include, but is not limited to, deleting the queue, deleting the workers, deleting the controllers and/or any combination of these, in some embodiments.

Example Computer System

Figure 23:
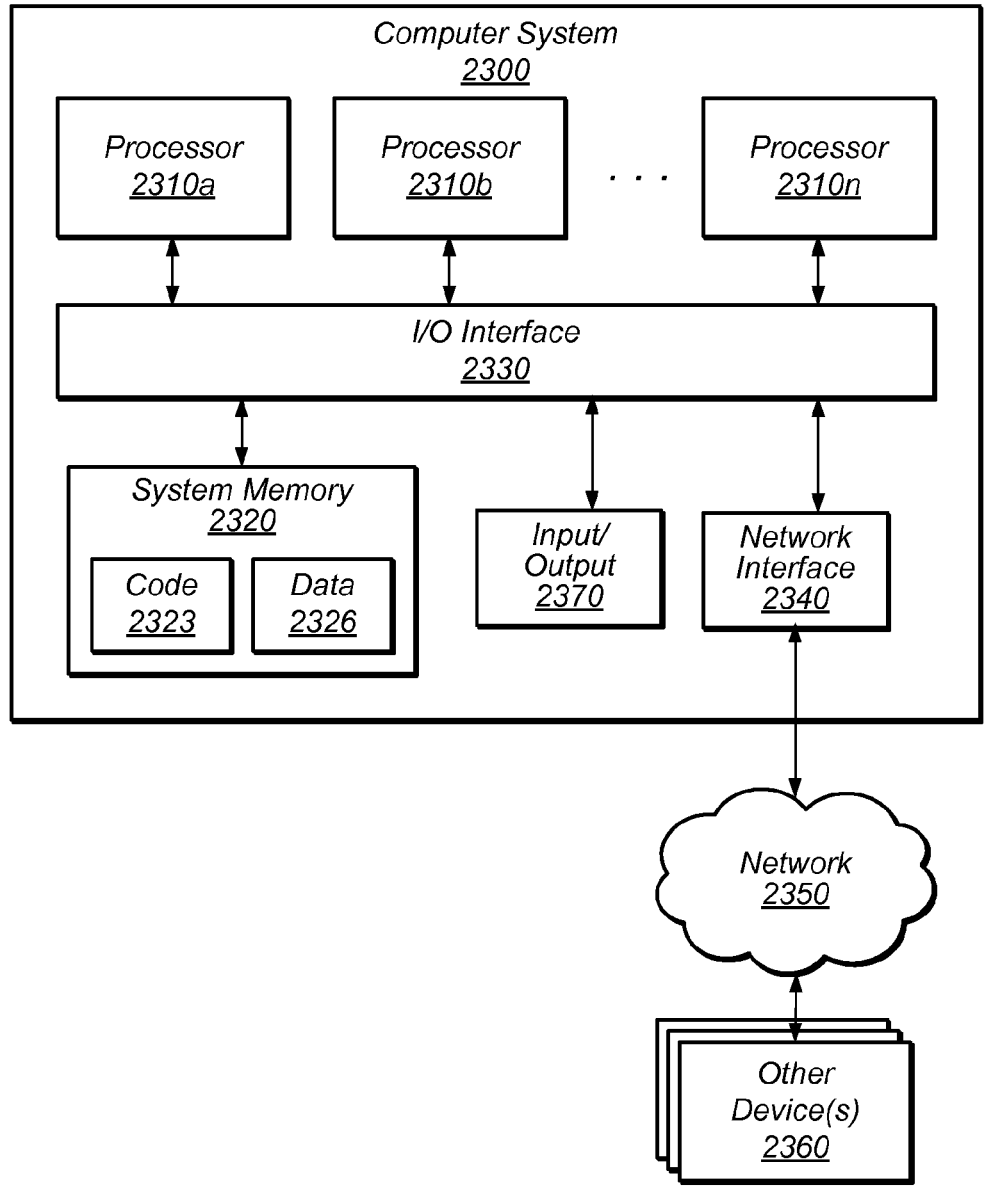
FIG. 23 illustrates a computer system for use in implementing a test system, according to one embodiment.

FIG. 23 is a diagram that illustrates a computer system for use in implementing a test system, according to one embodiment. Various portions of systems in FIGS. 1 and 5 and/or methods presented in FIGS. 1-6, 8-10, 12-13, 15 and 17-22 and/or described herein, may be executed on one or more computer systems similar to that described herein, which may interact with various other devices of the system.

In the illustrated embodiment, computer system 2300 includes one or more processors 2310 coupled to a system memory 2320 via an input/output (I/O) interface 2330. Computer system 2300 further includes a network interface 2340 coupled to I/O interface 2330, and one or more input/output devices 2350, such as cursor control device 2360, keyboard 2370, audio device 2390, and display(s) 2380. In some embodiments, it is contemplated that embodiments may be implemented using a single instance of computer system 2300, while in other embodiments multiple such systems, or multiple nodes making up computer system 2300, may be configured to host different portions or instances of embodiments. For example, in one embodiment some elements may be implemented via one or more nodes of computer system 2300 that are distinct from those nodes implementing other elements.

In various embodiments, computer system 2300 may be a uniprocessor system including one processor 2310, or a multiprocessor system including several processors 2310 (e.g., two, four, eight, or another suitable number). Processors 2310 may be any suitable processor capable of executing instructions. For example, in various embodiments, processors 2310 may be general-purpose or embedded processors implementing any of a variety of instruction set architectures (ISAs), such as the x86, PowerPC, SPARC, or MIPS ISAs, or any other suitable ISA. In multiprocessor systems, each of processors 2310 may commonly, but not necessarily, implement the same ISA.

In some embodiments, at least one processor 2310 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 2320 may be configured to store program instructions and/or data accessible by processor 2310. In various embodiments, system memory 2320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 2320 as program instructions 2323 and data storage 2326, respectively. In other embodiments, program instructions and/or data may be received, sent or stored upon different types of computer-accessible media or on similar media separate from system memory 2320 or computer system 2300. Generally speaking, a computer-accessible medium may include storage media or memory media such as magnetic or optical media, e.g., disk or CD/DVD-ROM coupled to computer system 2300 via I/O interface 2330. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2340. Program instructions may include instructions for implementing the techniques described with respect to any of the FIGs.

In some embodiments, I/O interface 2330 may be configured to coordinate I/O traffic between processor 2310, system memory 2320, and any peripheral devices in the device, including network interface 2340 or other peripheral interfaces, such as input/output devices 2370. In some embodiments, I/O interface 2330 may perform any necessary protocol, timing or other data transformations to convert data signals from one component (e.g., system memory 2320) into a format suitable for use by another component (e.g., processor 2310). In some embodiments, I/O interface 2330 may include support for devices attached through various types of peripheral buses, such as a variant of the Peripheral Component Interconnect (PCI) bus standard or the Universal Serial Bus (USB) standard, for example. In some embodiments, the function of I/O interface 2330 may be split into two or more separate components. In addition, in some embodiments some or all of the functionality of I/O interface 2330, such as an interface to system memory 2320, may be incorporated directly into processor 2310.

Network interface 2340 may be configured to allow data to be exchanged between computer system 2300 and other devices 2360 attached to a network, such as other computer systems, or between nodes of computer system 2300. In various embodiments, network interface 2340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2370 may, in some embodiments, include one or more display terminals, keyboards, keypads, touchpads, scanning devices, voice or optical recognition devices, accelerometers, multi-touch screens, or any other devices suitable for entering or retrieving data by one or more computer system 2300. Multiple input/output devices 2370 may be present in computer system 2300 or may be distributed on various nodes of computer system 2300. In some embodiments, similar input/output devices may be separate from computer system 2300 and may interact with one or more nodes of computer system 2300 through a wired or wireless connection, such as over network interface 2340.

Memory 2320 may include program instructions 2323, configured to implement embodiments of a layout-preserved text generation method as described herein, and data storage 2326, comprising various data accessible by program instructions 2323. In one embodiment, program instructions 2323 may include software elements of a method illustrated in the above figures. Data storage 2326 may include data that may be used in embodiments described herein. In other embodiments, other or different software elements and/or data may be included.

Those skilled in the art will appreciate that computer system 2300 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 2300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2300 may be transmitted to computer system 2300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations. In some embodiments, portions of the techniques described herein (e.g., preprocessing of script and metadata may be hosted in a cloud computing infrastructure.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
   a network-based production service implemented by one or more computers, wherein the production service is configured to capture production request data;
   a data store configured to store the production request data captured at the production service; and
   a test system implemented by one or more computers, wherein said test system comprises:
      a clustering module configured to perform analysis of a segment of the production request data to determine one or more cluster definitions defining one or more clusters of the production request data;
      a predictive load builder configured to process the production request data from the data store into a predictive test load based on the one or more cluster definitions, wherein to build the predictive test load the predictive load builder is configured to modify a size of one or more clusters of the production request data from the data store;
      one or more controllers configured to create test jobs to simulate the predictive test load on the production service, wherein each job specifies a portion of the predictive test load;
      a job queue configured to receive and queue test jobs from the one or more controllers; and a plurality of workers configured to access jobs from the job queue and play the predictive test load to the production service as specified in each job.

2. The system of claim 1, wherein to perform said analysis of the segment of the production request data, the clustering module is further configured to:
   vectorize the segment of production request data into vectors according to a vector definition; and
   analyze the vectors to determine the one or more cluster definitions.

3. The system of claim 1, wherein to modify a size of one or more clusters of the production request data, said predictive load builder is further configured to:
   increase the size of at least one of the one or more clusters through retrieval of additional production request data from another segment of the production request data, wherein the retrieved additional production request data corresponds to the same cluster definition as the at least one of the one or more clusters; or
   decrease the size of at least one of the one or more clusters through removal of some of the production request data from the cluster.

4. The system of claim 3, wherein to increase the size of at least one of the one or more clusters through retrieval of additional production request data from another segment, the predictive load builder is further configured to:
   determine a pattern in the production request data, wherein the segment of the production request data is part of the pattern;
   identify a location of the segment of the production request data in the pattern; and
   select a matching segment having the same location as said identified location of the segment in the pattern, wherein said retrieval of additional production request data is from said selected matching segment.

5. A method, comprising:
   performing, by one or more computing devices:
      creating a predictive test load, wherein said creating comprises:
         determining cluster definitions for a segment of stored production request data for a production service;
         receiving a specification for the predictive test load, wherein the specification indicates one or more modifications to sizes of data clusters of the segment of stored production request data according to the cluster definitions;
         modifying the segment of stored production request data to create the predictive test load according to the specification and the cluster definitions; and
         storing the predictive test load for playback to the production service to test the production service.

6. The method of claim 5, wherein said determining cluster definitions for the segment of stored production request data for the production service comprises:
   vectorizing production request data into vectors; and
   determining the cluster definitions from analysis of the vectors.

7. The method of claim 5, wherein said modifying the segment of stored production request data to create the predictive test load comprises:
   increasing the size of at least one of the one or more clusters, wherein increasing the size comprises retrieval of additional production request data from another segment of the production request data and wherein the retrieved additional production request data corresponds to the same cluster definition as the at least one cluster of the one or more clusters; or
   decreasing the size of at least one of the one or more clusters, wherein decreasing the size comprises removing at least some of the production request data from the at least one cluster.

8. The method of claim 7, wherein increasing the size of at least one cluster of the segment includes:
   determining a pattern in the production request data, wherein the segment of the production request data is part of the pattern;
   identifying a location of the segment of the production request data in the pattern; and
   selecting a matching segment having the same location as said identified location of the segment in the pattern, wherein said retrieval of additional production request data is from said selected matching segment.

9. The method of claim 7, wherein said retrieving additional production request data from another segment continues until a target amount of production request data is achieved for the at least one cluster of the segment, wherein the target amount is specified in said specification.

10. The method of claim 7, wherein modifying the segment of stored production request data to create the predictive test load preserves a respective order of the production request data within the other segment while adjusting the size of the at least one cluster of the segment.

11. The method of claim 5, wherein said determining cluster definitions comprises receiving user input specifying the cluster definitions.

12. The method of claim 5, further comprising:
   creating test jobs according to a test plan for testing the production service, wherein the test plan specifies production request data from said stored predictive test load and a test profile for using said stored predictive test load to simulate a load on the production service, and wherein each job specifies a portion of said stored predictive test load;
   adding the test jobs to a job queue according to the test plan;
   implementing one or more workers to access jobs from the job queue; and
   replay the production request data of the predictive test load to the production service as specified by the jobs.

13. The method of claim 12, further comprising scaling a number of the one or more workers in response to one or more metrics, wherein the one or more metrics comprise a job quantity metric for how many jobs are in the job queue or a worker load metric of load on the one or more workers.

14. The method of claim 12, further comprising scaling a number of the one or more workers based on a predictive metric based on the test profile in the test plan, wherein said scaling comprises:
   looking ahead according to the test profile; and
   scheduling an increase or decrease in the number of workers based on a predicted change in the amount of jobs according to the test profile.

15. A non-transitory computer-readable storage medium storing program instructions executable by a computer to:
   determine cluster definitions for a segment of stored production request data for a production service, wherein to determine said cluster definitions said program instructions are executable to:
      vectorize the segment of production request data into vectors, and
      perform a clustering analysis on the vectors to determine said cluster definitions;

receive a specification for a predictive test load, wherein the specification indicates one or more modifications to sizes of data clusters of the segment of stored production request data according to the cluster definitions;

modify the segment of stored production request data to create the predictive test load according to the specification and the cluster definitions; and store the predictive test load for playback to the production system to test the production system.

16. The non-transitory computer-readable storage medium of claim 15, wherein to modify the segment of stored production request data to create the predictive test load the program instructions are further executable to:

increase the size of at least one of the data clusters through retrieval of additional production request data from another segment of the production request data, wherein the retrieved additional production request data corresponds to the same cluster definition as the at least one of the one or more clusters; or decrease the size of at least one of the one or more clusters through removal of some of the production request data from the cluster.

17. The non-transitory computer-readable storage medium of claim 16, wherein to increase the size of at least one of the one or more clusters the program instructions are further executable to:

determine a pattern in the production request data, wherein the segment of the production request data is part of the pattern;

identify a location of the segment of the production request data in the pattern; and select a matching segment having the same location as said identified location of the segment in the pattern, wherein said retrieval of additional production request data is from said selected matching segment.

18. The non-transitory computer-readable storage medium of claim 15, wherein the program instructions are further executable to:

create test jobs according to a test plan for testing the production service, wherein the test plan specifies production request data from said stored predictive test load and a test profile for using the production request data to simulate a load on the production service, and wherein each job specifies a portion of said stored predictive test load;

add the test jobs to a job queue according to the test plan; and implement one or more workers to access jobs from the job queue and replay the specified production request data to the production service as specified by the jobs.

19. The non-transitory computer-readable storage medium of claim 18, wherein the program instructions are further executable to automatically shut down the simulated load on the production service in response to one or more of the following:

number of test jobs in the job queue exceeding a given threshold;

number of workers exceeding a given threshold;

number or percentage of workers that failed; or one or more load metrics on the production service above a given threshold.

20. The non-transitory computer-readable storage medium of claim 18, wherein said test profile indicates a rate at which the specified production request data is to be replayed to the production service.

* * * * *